United States Patent
Zhang

[19]

[11] Patent Number: 6,154,541

[45] Date of Patent: Nov. 28, 2000

[54] METHOD AND APPARATUS FOR A ROBUST HIGH-SPEED CRYPTOSYSTEM

[76] Inventor: Jinglong F Zhang, 10909 Santa Clara Dr., Fairfax, Va. 22030

[21] Appl. No.: 08/941,350

[22] Filed: Sep. 30, 1997

Related U.S. Application Data

[60] Provisional application No. 60/035,197, Jan. 14, 1997.

[51] Int. Cl.[7] .................................. H04L 9/28; H04L 9/14
[52] U.S. Cl. ................................ 380/28; 380/30; 380/44; 380/21
[58] Field of Search .................................. 380/21, 28, 30, 380/44, 46, 49

[56] References Cited

U.S. PATENT DOCUMENTS

| | | | |
|---|---|---|---|
| 4,200,770 | 4/1980 | Diffie et al. | 380/30 X |
| 4,218,582 | 8/1980 | Hellman et al. | 380/30 X |
| 4,306,111 | 12/1981 | Lu et al. | 380/30 |
| 4,399,323 | 8/1983 | Henry | 380/30 |
| 4,405,829 | 9/1983 | Rivest et al. | 380/30 X |
| 4,694,491 | 9/1987 | Horne et al. | 380/20 |
| 5,008,818 | 4/1991 | Bocast | 714/2 |
| 5,146,500 | 9/1992 | Maurer | 380/30 X |
| 5,297,206 | 3/1994 | Orton | 380/30 X |
| 5,463,690 | 10/1995 | Crandall | 380/30 |
| 5,623,262 | 4/1997 | Normile et al. | 341/67 |
| 5,627,893 | 5/1997 | Demytko | 380/30 |

OTHER PUBLICATIONS

Bruce Schneier, "Applied Cryptography: Protocols, Algorithms, and Source Code in C", 2nd edition John Wiley and Sons, N.Y. (1995) pp. 461–466 (Knapsack Algorithms).

L. Adleman "On Breaking the Iterated Merkle–Hellman Public–Key Cryptosytem" Advances in Cryptology: Proceedings of Crypto '82, Plenum Press, 1983, pp. 303–308.

E. F. Brickell "Breaking Iterated Knapsacks" Advances in Cryptology: Proceedings of Crypto '84, Springer–Verlag, 1985, pp. 342–358.

Chor & Rivest "A Knapsack Type Public–Key Crytosystem based on Arithmetic in Finite Fields" Advances in Cryptology Crypto '84 Berlin: Springer–Verlag, 1985, pp. 54–65.

W. Diffie & M. E. Hellman "New Directions in Cryptography", IEEE Transactions on Information Theory, vol. IT–22 1976, pp. 644–654.

T. ElGamal "A Public Key Cryptosystem and a Signature Scheme based on Discrete Logarithms" IEEE Transactions on Information Theory, vol. 31, 1985, pp. 469–472.

R. M. Goodman & A. J. McAuley (Related) "New Trapdoor Knapsack Public Key Cryptosystem" Advances in Cryptology Proceedings of Eurocrypt '84 Berlin: Springer–Verlag, 1985, pp. 150–158.

H. Isselhorst "The Use of Fractions in Public–Key Cryptosystems" Advances in Cryptology Eurocrypt '89, Berlin: Springer–Verlag, 1990, pp. 47–55.

C. S. Laih, J. H. Lee, L. Harn & Y. K. Su "Linearly Shift Knapsack Public–Key Cryptosystem" IEEE Journal Selected Areas in Communication, vol. 7, No. 4, May 1989, pp. 534–539.

Y. M. Chee, A. Joux, & J. Stern "The Cryptanalysis of a New Public–Key Cryptosystem Based on Modular Knapsacks" Advances in Cryptology Crypto '91, Berlin: Springer–Verlag, 1991, pp. 204–212.

S. C. Lu & L. N. Lee "A Simple and Effective Public–Key Cryptosystem" COMSAT Technical, Review, vol. 9, No. 1, 1979, pp. 15–24.

(List continued on next page.)

*Primary Examiner*—Pinchus M. Laufer

[57] ABSTRACT

A cryptographic information and communication system of the knapsack type characterized by secret logical segregation of the key sets into sections by different construction methods, where different transformations are applied to different sections, and characterized by non-constant number of subset sum solutions to ciphertext, where resolution protocols are employed when necessary to resolve non-unique subset sum solutions at the decryptor.

17 Claims, 5 Drawing Sheets

OTHER PUBLICATIONS

R. J. McEliece "A Public Key Cryptosystem based on Algebraic Coding Theory" JPL (Jet Propulsion Laboratory) DSN (Deep Space Network) Progress Report 42–44, Jan.–Feb. 1978, pp. 114–116.

R. C. Merkle & M. E. Hellman "Hiding Information and Signatures in Trapdoor Knapsacks" IEEE Transactions on Information Theory, vol. IT–24, 1978, pp. 525–530.

V. S. Miller "Use of Elliptic Curves in Cryptography" Advances in Cryptology Crypto '85 Proceedings, Springer–Verlag, 1986, pp. 417–426.

V. Niemi "A New Trapdoor in Knapsacks" Advances in Cryptology Eurocrypto '90 Berlin: Springer–Verlag, 1991, pp. 405–411.

G. A. Orton "A Multiple–Iterated Trapdoor for Dense Compact Knapsack" Advances in Cryptology Eurocrypto '94 Proceedings, Berlin: Springer–Verlag, 1995 pp. 112–130.

A. Shamir "A Polynominal Time Algorithm for Breaking the Basic Merkle–Hellman Cryptosystem" Advances in Cryptology: Proceedings of Crypto '82, Plenum Press, 1983, pp. 279–288.

C. P. Schnorr & H. H. Hörner "Attacking the Chor–Rivest Cryptosystem by Improved Lattice Reduction" Advances in Cryptology Eurocrypto '95 Proceedings, Berlin: Springer–Verlag, 1995, pp. 1–12.

J. Stern & P. Toffin "Cryptanalysis of Public–Key Cryptosystem base on Approximations by Rational Numbers" Advances in Cryptology Eurocrypt '90, Berlin: Springer–Verlag, 1991, pp. 313–317.

A. I. Turkin "Cryptanalysis of McEliece's Public–Key Cryptosystem" Advances in Crytoplogy Eurocrypt '91, Berlin: Springer–Verlag, 1991, pp. 68–70.

METHOD AND APPARATUS FOR A ROBUST HIGH-SPEED CRYPTOSYSTEM

CROSS REFERENCE TO RELATED APPLICATION

This application is a continuation-in-part of my earlier U.S. provisional patent application Ser. No. 60/035,197 filed on Jan. 14, 1997.

BACKGROUND OF THE INVENTION

1. Field of the Invention

This invention relates to cryptographic systems (cryptosystems) for data and information protection, and in particular to public-key cryptosystems for data and information protection in communications, to their related methods and protocols.

2. Background Description

Advances in computer and digital technology have been expanding the scope of business applications at a fast pace. Information in electronic or digital form is being used to an ever greater extent and is replacing older methods of information management, resulting in a rapid increase in the volume of digital data stored, retrieved, shared, transmitted and exchanged. Yet all applications are faced with the challenge of protecting data and information on one level or another against unauthorized access and deliberate tampering. The challenge is more prominent when data need to be transferred from one physical location to another over some communications channels that are not secure or, in most cases, the physical media used for these communications, such as a radio link, make it infeasible or impossible to guarantee exclusive access. Financial transactions like those between banks, private information such as electronic mail, proprietary or confidential data such as mobile phone identifications or pins used in electronic banking, are all examples of applications where data and information protection is indispensable. In general, for a great many applications, data need to be protected while being physically moved from one location to another or while being statically or transiently stored on hard disks, tapes, in memory, or other media.

Three primary attributes of modern information management and communications are: security, authenticity and data integrity. Cryptography is a means to construct information and communication systems having these attributes.

Protection of data/information by ways of scrambling using unpublished methods and secret encryption has a fairly long history. But public-key cryptography was only recently pioneered by W. Diffie and M. Hellman with their milestone paper "New Directions in Cryptography", IEEE Transactions on Information Theory, Vol. IT-22, 1976, pp. 644–654. The first scheme of secure communications over insecure media, introduced by Diffie and Hellman, is described in U.S. Pat. No. 4,200,770. In such a scheme, a key is securely exchanged and established between two communicating parties totally without any pre-arrangement for such a key, although the realization of the scheme is not a public-key cryptosystem and, for this basic key exchange scheme, the same key may not be later exchanged with another third party.

The first true public-key cryptosystem, a knapsack cryptosystem, was proposed by R. Merkle and M. Hellman (see "Hiding Information and Signatures in Trapdoor Knapsacks", IEEE Transactions on Information Theory, Vol. IT-24, 1978, pp. 525–530, and also see U.S. Pat. No. 4,218,582). The system offers public-key encryption and a scheme for digital signature. However, a few years after the issuance of the patent, it was shown to be insecure.

Since the concept of one-way trapdoor and asymmetricity in cryptography was introduced, many public-key cryptosystems have been invented. The RSA cryptosystem is described in U.S. Pat. No. 4,405,829 to Rivest, Shamir and Adleman. The cryptosystem of T. ElGamal is depicted in "A Public Key Cryptosystem and a Signature Scheme based on Discrete Logarithms", IEEE Transactions on Information Theory, Vol. 31, 1985, pp. 469–472. The recently advanced cryptographic systems using elliptic curves started with Victor S. Miller's paper "Use of Elliptic Curves in Cryptography", Advances in Cryptology CRYPTO '85 Proceedings, Berlin: Springer-Verlag, 1985, pp. 417–426. As an example, see the scheme of U. Maurer, U.S. Pat. No. 5,146,500.

The public-key cryptographic methods of today are based on three types of mathematical hard problems: discrete logarithm, factorization of composite of large primes, and knapsack. Some are based on the variations of the three basic problems, such as error correcting codes and product of finite automata. Knapsack cryptosystems, with the exception of Chor-Rivest cryptosystem, are the only ones that can achieve practical data encryption/decryption speed with current technology for application needs in general. The other types all suffer from low speed for encryption, decryption and/or key generation. As a result, efforts in developing knapsack cryptosystems have been tremendous, prolific and, despite repeated very disappointing revelation of weakness in their security, persistent. Nevertheless, the outlook of knapsack cryptosystems has not been encouraging. Besides a common imperfection of such cryptosystems, namely data expansion during encryption that results in a low information rate, the great majority of knapsack cryptosystems have been broken since 1982 with the first valid attack by Shamir on the basic Merkle-Hellman cryptosystem (see "A Polynomial Time Algorithm for Breaking the Basic Merkle-Hellman Cryptosystem", Advances in Cryptology: Proceedings of CRYPTO '82, Plenum Press, 1983, pp. 279–288), the successful cryptanalysis by Brickell of the multiple iterated version (see "Breaking Iterated Knapsacks", Advances in Cryptology, Proceedings of CRYPTO '84, Berlin: Springer-Verlag, 1985, pp. 342–358), and the implementation of the $L^3$ (Lenstra, Lenstra and Lovacz) lattice basis reduction algorithm which is powerful and applies in general to knapsack problems, not just knapsack cryptosystems.

S. C. Lu and L. N. Lee proposed a more generalized version of knapsack cryptosystem using the Chinese Remainder Theorem (see "A Simple and Effective Public-Key Cryptosystem", COMSAT Technical Review, Vol. 9, No. 1, 1979, pp. 15–24). R. M. Goodman and A. J. McAuley developed another variant of knapsack cryptosystem (see "New Trapdoor Knapsack Public Key Cryptosystem", Advances in Cryptology: Proceedings of EUROCRYPT '84, Berlin: Springer-Verlag, 1985, pp. 150–158). H. Isselhorst advanced a knapsack cryptosystem using rational number (see "The Use of Fractions in Public-Key Cryptosystems", Advance in Cryptology EUROCRYPT '89, Berlin: Springer-Verlag, 1990, pp. 47–55). V. Niemi also proposed a knapsack cryptosystem (see "A New Trapdoor in Knapsacks", Advances in Cryptology EUROCRYPT '91 Proceedings, Berlin: Springer-Verlag, 1991, pp. 405–411). Another fast cryptosystem was by R. J. McEliece based on error correcting Goppa codes (see JPL (Jet Propulsion Laboratory) DSN (Deep Space Network) Progress Report 42–44, January–February 1978, pp. 114–116). All these cryptographic schemes and systems as well as various other knapsack variations were cryptanalized and described in the following papers: "A survey of recent results" by Brickell and Odlysko, Contemporary Cryptology, IEEE Press, 1992, pp. 501–540; "Cryptanalysis of Public-Key Cryptosystem based on Approximations by Rational Numbers" by J. Stern and P. Toffin, Advances in Cryptology EUROCRYPT '91, Berlin: Springer-Verlag, 1991, pp. 313–317; "The Cryptanalysis of a New Public-Key Cryptosystem based on Modular Knapsacks", by Y. M. Chee, A. Joux and J. Stern in Advances in Cryptology CRYPTO '91, Berlin: Springer-Verlag, 1991, pp. 204–212; "Cryptanalysis of McEliece's Public-Key Cryptosystem" by A. I. Turkin, Advances in Cryptology EUROCRYPT '91, Berlin: Springer-Verlag, 1991, pp. 68–70. Several knapsack type cryptosystems are not known to be broken or completely broken: the linearly shift knapsack cryptosystem by C. S. Laih et al (see "Linearly Shift Knapsack Public-Key Cryptosystem", IEEE Journal Selected Areas in Communication, Vol. 7, No. 4, May 1989, pp. 534–539), the Chor-Rivest cryptosystem (see "A Knapsack Type Public-Key Cryptosystem based on Arithmetic in Finite Fields", Advances in Cryptology CRYPTO '84, Berlin: Springer-Verlag, 1985, pp. 54–65), and the residue knapsack cryptosystem of Glen A. Orton (see "A Multiple-Iterated Trapdoor for Dense Compact Knapsacks", Advances in Cryptology CRYPTO '94, Berlin: Springer-Verlag, 1994, pp. 112–130, and U.S. Pat. No. 5,297,206). However, since partial exposure is not adequately addressed, these systems face potential threat. As mentioned earlier, the $L^3$ lattice basis reduction algorithm is powerful and there have been improvements in applying it, such as the results published by C. P. Schnorr and H. H. Horner in "Attacking the Chor-Rivest Cryptosystem by Improved Lattice Reduction", Advances in Cryptology EUROCRYPT '95 Proceedings, Berlin: Springer-Verlag, 1995, pp. 1–12.

The quality of a cryptosystem depends on its security, performance, flexibility, cost and scope of applications. Such dependent factors are inter-related and, in a lot of cases, the improvement of one may result in the degradation of another or others.

In the prior art, cryptosystems can be classified into two major categories, the classic, private-key or symmetric cryptosystems, such as DES, and public-key or asymmetric cryptosystems, such as RSA. Public-key cryptosystems can be further categorized into single-layer and multi-layer cryptosystems.

When a public-key cryptosystem uses more than one layer, (i.e. when it encrypts the keys that are used to perform encryption), it is a multi-layer cryptosystem. Such a system is more complex than a single-layer cryptosystem, and key establishment requires additional time. The use of multi-layers in the prior art cryptosystems is mostly due to the slow speed of the cryptographic method, such as RSA, that provides the asymmetricity and the security needed. However, in the prior art, few cryptosystems are reported to use more than two layers and layers are not used for increased security in asymmetricity.

Since the late 1970's, quite a number of public-key cryptosystems have been proposed. Of all that are proposed so far, many have more theoretical interest than practicality and among them only a handful resisted attacks and remain unbroken. Some that have promised practicality are Chor-Rivest Knapsack Cryptosystem, Cryptosystems based on Discrete Exponentiation, McEliece Cryptosystem, Elliptic Curves Cryptosystems, and—the best known—RSA Cryptosystem.

However, improvements and new approaches to existing cryptographic methods and apparatuses are needed to provide secure cryptosystems that offer high level performance and robustness.

OBJECTS AND SUMMARY OF THE INVENTION

Therefore, it is an object of this invention to provide methods for implementing cryptosystems for data protection and secure communications, for enforcing data integrity and for properly identifying communication parties.

It is another object of this invention to provide methods for implementing cryptosystems of superior performance to existing high security public-key cryptographic systems.

It is still another object of this invention to provide methods for implementing various levels of security desired with dynamic adjustment to the key length, data length and/or other parameters.

It is still another object of this invention to provide methods for implementing cryptosystems with fast, easy key generation.

It is still another object of this invention to provide methods for user to control key generation, for implementing cryptosystems capable of mapping a password and random input to cryptographic keys and to use expand hash for the mapping.

It is still another object of this invention to provide methods for implementing cryptosystems to provide fast, efficient encryption/decryption.

It is still another object of this invention to provide methods for implementing fast, software cryptosystems.

It is still another object of this invention to provide methods for a simple, low cost hardware implementation of fast cryptosystems.

It is still another object of this invention to provide methods for implementing flexible and less complex cryptosystems.

It is still another object of this invention to provide methods for implementing public-key cryptosystems.

It is still another object of this invention to provide methods for implementing cryptosystems that do not expose the public key but protect it when it is being openly distributed over insecure media or communication channels.

It is still another object of this invention to provide methods for implementing low cost cryptosystems with a wide range of applications taking advantage of their fast speed and robustness.

It is still another object of this invention to provide methods for implementing cryptosystems for encrypting and decrypting digital data.

It is still another object of this invention to provide message-specific public-key cryptosystems with message-specific private encryption keys and public decryption keys.

It is still another object of this invention to provide methods for generating public key sets in sections by different construction methods and by different transformations using different transformation parameters.

It is still another object of this invention to provide methods for allowing residues (noise) in the subset sums of the public encryption key.

It is still another object of this invention to provide methods for disturbing regularities and dependency amongst the elements of the public encryption key set.

It is still another object of this invention to provide methods for introducing fuzziness, both removable and unremovable, into the cryptosystem so that correct decoding and decryption relies on other factors than purely subset sum solutions.

It is still another object of this invention to provide methods for creating extended key sets and for embedding significant key or data elements among insignificant elements.

It is still another object of this invention to provide methods for secure key distribution.

It is still another object of this invention to provide methods for generating secure sequences by way of segmentation, fragmentation, multi-seeding, and re-seeding.

It is still another object of this invention to provide methods, such as backward-and-forward scrambling, to prevent partial exposure of encrypted data by partial success of cryptanalysis via attack-on-code.

It is still another object of this invention to provide methods to generate the closure of a scaled set and to use the concept in constructing partially identifiable/tangible sets.

It is still another object of this invention to provide methods of generating partially identifiable/tangible sets as extended public key sets.

It is still another object of this invention to provide methods of multi-step and delayed bit recovery.

It is still another object of this invention to offer practical single-layer keys, single-layer mode and single-layer public-key cryptosystems.

It is still another object of this invention to provide methods for reducing the accumulative success of cryptanalysis, in particular without increase in key size.

It is still another object of this invention to provide methods to reduce the cost of key management and key maintenance, and to offer no-key-management public-key cryptosystem. It is still another object of this invention to provide methods for implementing cryptosystem with adjustable security levels without change in the key length.

It is still another object of this invention to provide message-specific keys using message-specific rugged compact set mapping, message-specific fuzzy residue mapping, and/or other parameters than the public key set itself.

It is still another object of this invention to provide methods for implementing cryptosystems that operate in both private-key and public-key modes effectively and efficiently.

It is still another object of this invention to provide methods to limit key size, to control and minimize data expansion by way of complementation with regards to the moduli.

It is still another object of this invention to provide methods for performing the primitive of mutual identification and exchange of public encryption keys.

This invention is a robust, high-speed cryptosystem, characterized by employing various cryptographic methods and protocols. The basic concept of this invention is the application of key sets of identifiables. The key sets are constructed by the various methods of this invention in such a way that the structure of the encryption key is obscured, making the encryption key resistant to attacks even when used as a public encryption key. While this invention enjoys its fast speed in encryption, decryption and key generation, it can also adjust the many parameters of its crypt transformations, and even the data length, to achieve various desired levels of security. Six of the main features of this invention are:

1) logical segregation of the key set into sections where information about the segregation is not published and is computationally infeasible to gain from the public key,
2) special dependencies amongst set elements for decoding in addition to subset sum solution,
3) the use of resolution methods/protocols in conjunction with unremovable fuzziness that provides higher security,
4) effective and efficient methods to guard against partial exposure of encrypted data from attack-on-code,
5) a computationally infeasible task for cryptanalysis to obtain what is communicated and distributed via the extended sets by QPKS until the commencement of the QPKS protocol, and
6) a protocol of identification together with key exchange as a primitive that foils active type of attacks.

This invention offers easy and fast key generation, key generation control by users, message-specific private and public keys and password-to-key mapping.

Applications of this invention can be in several areas. Besides the basic applications of a public-key cryptosystem for secure data communications, data integrity, authentication and identification, this invention has other applications including file and private data protection, database protection, electronic mail, smart card, interactive communication devices that require fast response and quick connection establishment (telephone for example), facsimile, secure distributed computing, remote software/system activation control, access control, secure logon (especially remote logon with super privileges), secret access control sharing (in particular without a trusted party's active involvement), automated bank teller, electronic banking, no-key-management secure systems, secure key exchange and secure key distribution. In particular, this invention can perform the functions of special devices using general purpose computing devices, such as using a PC for voice communication over the internet in applications known as internet phone.

BRIEF DESCRIPTION OF THE DRAWINGS

The foregoing and other objects, aspects and advantages will be better understood from the following detailed description of preferred embodiments of the invention with reference to the drawings, in which.

DEFINITIONS AND TERMINOLOGY

Figure 1:
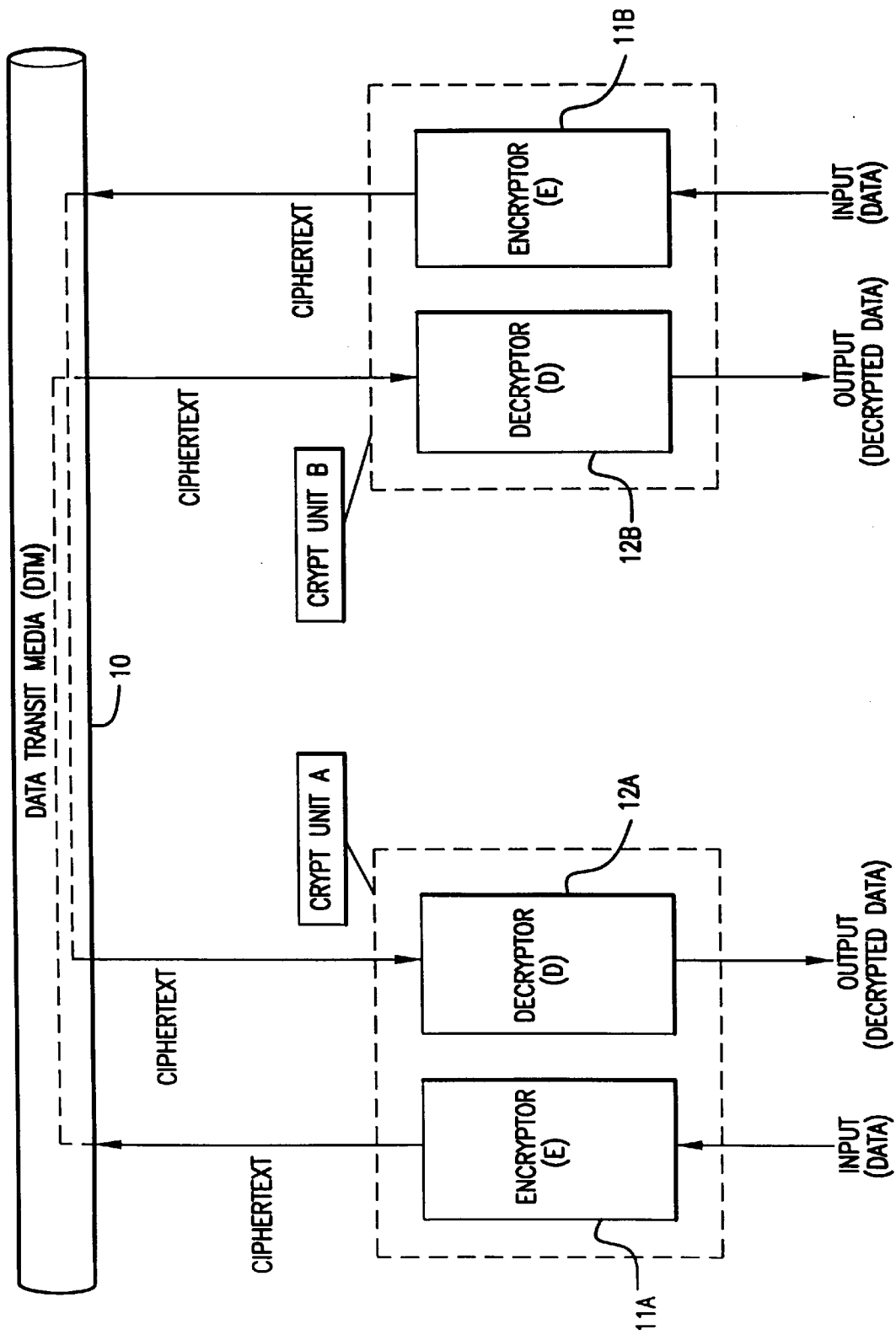
FIG. 1 is a block diagram showing the invention in summary form.

For the purposes of further describing the present invention, the following terminology and convention will be used.

In this invention, unless explicitly stated otherwise, sets, bags and vectors are used and referred to interchangeably as the context appropriates. Therefore, union operation for example is used generically for both set union and bag union, and when a set is referred to as a vector, the elements assume an ordering.

For an empty set X, sum(X) is defined to be zero.

≡

Modulo congruence (remainder) operation.

×

Inner (dot) product operation. E.g. for any two n-dimensional vectors A and B, where $A = (a_1, a_2, \ldots, a_n)$ and $B = (b_1, b_2, \ldots, b_n)$, $A \times B = \Sigma a_i * b_i$, for $1 \leq i \leq n$.

Concatenation operation.

∘

Function composition.

<

Assignment. E.g. X<A is to make X an exact copy of A, overwriting what was originally in X.

(x, y)=1 x is relatively prime to y.

⌊ ⌋

Truncation (floor) function. I.e. $\lfloor x \rfloor$ is the integer part of x (with the same sign as x).

Accumulative Success

See Accumulatively Successful

Accumulatively Successful

Let c be the codes of some arbitrary ciphertext, L be an arbitrary layer (see Multi-Layer Scheme for the definition of a layer), F be the implementation and application of some cryptanalysis function, and V be the implementation and application of some verification function, the range {0, 1} of V∘F is defined as follows:

---

1) (V(F(c)) = 1) <=> (F(c) can be verified by V to be the correct decodes of c), or
2) (V(F(L)) = 1) <=> (F(L) can be verified by V to be the correct decodes of L)

---

Let $X_c$ stand for "a cryptanalysis is accumulatively successful at code level", $X_L$ stand for "a cryptanalysis is accumulatively successful at layer level", then accumulatively successful is defined as follows:

$$X_c \Leftrightarrow (\exists_{V,F} (V(F(c)) = 1))$$

$$X_L \Leftrightarrow (\exists_{V,F} (V(F(L)) = 1))$$

(t-bit) Alternate Pad

Let C be some known classification of bit patterns of length t, $p_1, p_2, \ldots p_k$ be k consecutive bit groups each of length t, and $c_1, c_2, \ldots, c_n$ be all the possible classes by C, a t-bit alternate pad $(p_1 p_2 \ldots p_k)$ is defined as:

1) (positive t-bit alternate pad) $p_1 p_2 \ldots p_k$ such that $p_k \in c_i$ and $p_j \notin c_i$ for some $1 \leq i \leq n$ and for all $1 \leq j < k$ where (the fact that) $p_k \in c_i$ is known but k is not known, or
2) (negative t-bit alternate pad) $p_1 p_2 \ldots p_k \ni p_k \notin c_m$ and $p_j \in c_i$ for all $1 \leq j < k$, $k > 1$, and for some $1 \leq i \leq n$ and $m < >i$, where neither k nor $p_k \in c_m$ is known.

Attack-On-Key

Cryptanalysis method that tries to decipher the encrypted data through the discovery of keys. For certain cryptographic methods, the keys discovered need not be the very same keys used by the decryptor for decryption. They can be substitutes or alternate keys, which means that decryption keys may not be unique.

Attack-On-Code

Cryptanalysis method that tries to obtain the original, pre-encryption data by cryptanalizing the codes themselves, one by one.

Backward-and-Forward Scrambling A series of two or more scrambling operations on a data stream where the output of one scrambling operation is the input to another scrambling operation. At least one scrambling operation is a backward scrambling operation that reverses the order of its input data stream both before and after performing the scrambling operation, and at least one scrambling operation in the series is a forward scrambling operation that scrambles the data in the same order as they are taken as input. Both the backward scrambling operations and the forward scrambling operations scramble in a chaining fashion, where the scrambling of certain bits is influenced by previous bits in the input stream or by the scrambled version of previous bits in the input stream. Backward-and-Forward Scrambling may also be referred to as Forward-and-Backward Scrambling or Bi-directional Scrambling.

Bare Mode (of Communication)

In Bare Mode, only data to be securely transferred are protected and encrypted. Also see Shielded Mode.

Blurring Set

A set of numbers that are added to a key set to introduce unremovable fuzziness. Also see Unremovable Fuzziness.

Closure of Scaled Set

Let N be the set of natural numbers, y∈N and y>0, z∈N and z>0. If for a finite set $S = \{s_1, s_2, \ldots, s_m\} \subset N$, the following holds:

$$k_i < y \text{ for all } 1 \leq i \leq m \Rightarrow (\exists_{x \in N, x > 0} (x * t <> \lambda \text{ for any } t \in N \text{ and } t > 0))$$

where $\lambda = \text{sum}((s_1 * z_1) * k_1, (s_2 * z_2) * k_2, \ldots, (s_m * z_m) k_m)$, then S*z is called the scaled set of S or the closure of S scaled by z, and x is an identifiable of {x}∪S. The concept of closure can be generalized. Any operation that turns certain elements of a set into identifiables/tangibles when applied to the other elements of the set can be the 'scaling operation' for the closure. Also see Identifiable Element and Tangible Element.

Code of Ciphertext

One unit of encrypted data bits. Code of ciphertext is also referred to simply as code. The corresponding data bits are called a message unit.

Delayed Bit Recovery

See Multi-Step Bit Recovery.

Decode

One solution to a code. In particular for knapsack cryptography, a decode is one decomposition of a number into set members that make up the number exactly. It may not be the solution if the set is not a unique set. When decode is used as a verb, it refers to the operation of obtaining one solution to a code.

Decryption

Knowingly obtaining all the correct decodes of the encrypted message with the aid of the decryption key and possibly protocols.

Designated Element and Section

A designated element is an element of a key set whose containment in a subset sum determines how a certain non-zero fuzzy residue is applied to the subset sum. A designated section is a section of a key set in which two or more elements are designated and their collective containment in a subset sum determines how a certain non-zero fuzzy residue is applied to the subset sum.

Effective Success Rate

Rate of success on cryptanalizing an entire enciphered message (not the rate of success on cryptanalizing an individual code of ciphertext).

External Fuzziness
Fuzziness (more than one seemingly valid decode) to the cryptanalysis. Also see Fuzzy Residues and Internal Fuzziness.
Formal Identification
Identification by some formalism or by mechanism constructed based on some formalism.
Full Block Dependency
The property of a scrambled binary block: it is computationally infeasible to recover any bits from the scrambled block unless the unknown bits in the scrambled block is fewer than some positive integer n.
Fuzzy Residues
Numbers that when added to the subset sum of some U set can result in more than one decode. Fuzzy residue is applied, for example, by the addition of a certain multiple of an element from a set of fuzzy residues to a subset sum, in accordance with a defined mapping and determined by the number of a key element contributed to the subset sum. Also see Internal Fuzziness and External Fuzziness.
Hash
Hash is some kind of scrambling (function) that may not be invertible. A hash is expanding if its input size is smaller than its output size. Such a hash is also referred to as expand hash. A hash is compressing if its input size is greater than its output size. Such a hash is also referred to as compress hash. For practical purposes and without loss of generality, a hash function h is talked about in the context of a finite domain. A hash h is collision free if for any given input x (in the domain of h), the following holds:

$$(h(x) = h(y)) \Rightarrow (x = y)$$

A hash h is collision sparse if for any given input x (in the domain of h), $\pi$ is quite small relative to $\delta$, where $\delta$ is the size of the domain of h and $\delta$ is the size of the largest subset S of the domain of h satisfying the following:

$$h(x)=h(s) \text{ where } x<>s \text{ and } s \in S$$

A hash h is collision ridden, if $\pi$ is quite large relative to $\delta$. A hash h is one-way, if for any given h(x), it is computationally infeasible to derive x from h(x). A hash h is one-way-sparse, if for any given h(x), it is computationally infeasible to find some y in the domain of h such that h(x)=h(y).
Higher-Layer
See Multi-Layer Scheme
Identifiable Element
An element of a set (or its multiple) that can be uniquely, deterministically, unambiguously and efficiently identified from any subset sum it contributed to. It is also referred to as an identifiable.
Informal Identification
Identification by human and not by mechanism constructed based on formalism.
Internal Fuzziness
Fuzziness (more than one seemingly valid decode) to the decryptor (decryption by keys). Also see Fuzzy Residues and External Fuzziness.
Inverse Iteration
Inverse Iteration is an iteration. Inverse iteration is an operation on a set $B=\{b_1, b_2, \ldots, b_n\}$ of numbers defined to be:

$$(B*w^{-1})\Xi m = \{b_1 * w^{-1} \Xi m, \ldots, b_2 * w^{-1} \Xi m, \ldots, b_n * w^{-1} m\}$$

where B is (equals) an iterated set from some set A by some w and m, and $w^{-1}$ is the multiplicative inverse of w modulo m. To inverse iterate is to perform such a inverse-iteration on a set. Also see Iteration.
Iteration
An operation on a set $A=\{a_1, a_2, \ldots, a_n\}$ of numbers defined to be:

$$(A*w)\Xi m = \{a_1 * w \Xi m, a_2 * w \Xi m, \ldots, a_n * w \Xi m\}$$

for some w and m, where (w, m)=1. To iterate is to perform such an iteration on a set.
Also see Inverse Iteration.
Layer
See Multi-Layer Scheme.
Layered-Scheme
See Multi-Layer Scheme.
Lower-Layer
See Mtulti-Layer Scheme.
m-Identifiable (m-Tangible) Set
A set containing m identifiables (tangibles). m-Identifiable (m-Tangible) Set is also referred to as Partially Identifiable (Tangible) Set if the set size is greater than m.
Multi-Layer Public-Key Cryptosystem
A cryptosystem that adopts multi-layer scheme of some cryptographic methods.
Multi-Layer Scheme
A method where encryption keys are also encrypted. The method in which the encryption key is used directly to encrypt data is a single-layer scheme. Each encryption of an encryption key is an added layer. A lower layer is an encrypted binary block in which there is an encryption key. A higher layer is a binary block in which there is an encryption key that encrypts a lower layer or data.
Multi-Step Bit Recovery
In decryption, certain bits x are recovered in more than one step. Each step, which recovers other bits in the meanwhile, gains some partial information that will assist the final recovery of x in a later step.
Near-Unique Set
A set that, except for a limited few elements, is a unique set.
Non-Unique Set
A set that is not a U Set. In other words, there exist subsets A and B of the non-unique set such that sum(A)=sum(B) but A<>B. Also see Unique Set (U Set), and Near-Unique Set.
One-way Characteristics Function
A computationally infeasible-to-invert function that returns some characteristics of the input to it. In other words, it is computationally infeasible to deduce the input or part of the input from the output of the One-way Characteristics Function.
Operational Password Length
The minimum length of passwords that a cryptosystem will accept.
Partial Exposure
Undesired exposure and revelation of part of a message from its corresponding ciphertext by cryptanalysis.
Partially Identifiable (Tangible) Set
See m-Identifiable (m-Tangible) Set.
Private-Key Encryption
Encryption performed by the keys of either a asymmetric or symmetric method with keys kept secret. Private-key encryption is also known as secret key encryption. In the prior art, private key encryption may only refer to encryption by symmetric keys.

Ranged Number
A number that falls within a (specified) range.
Reflexive Dependency (of Message Units)
In the decryption of a code, the recovery of certain bits of the message unit depends on the correct recovery of certain other bits of the same message unit. Such kind of dependency is Reflexive Dependency of Message Units or simply Reflexive Dependency.
Removable Fuzziness
Fuzziness (resulted from fuzzy residues), internal or external, that can be removed. In other words, of all the decodes of a code, only one of the decodes is valid and can be verified to be valid with no more information than what is available and contained in the code(s).
Residue
The notion of residue is used in two ways:
1) residue class as used in G. Orton's residue knapsack.
2) 'noise' as used in some places in this invention and the d parameter used in Chor-Rivest knapsack.
Rugged Compact Set
A rugged compact set is a compact set where not all subset sums are valid and defined.
Scrambling vs Encryption
For the purpose of this invention, a distinction is made between scrambling and encryption. Scrambling is transformation of data from some easily recognizable format to another that is not. But scrambling does not guarantee that the scrambled data can not be easily transformed back to their original format or to another easily recognizable format if the scrambling method is known. Encryption is transformation of data from an easily recognizable format to one that is neither easily recognizable nor feasibly transformable, through a certain implementable algorithm, to an easily recognizable format, even if the cryptographic method is public knowledge.
Secret Key Encryption
See Private-Key Encryption.
Sectioned Key Set
A sectioned key set is the union of sets that may be generated with different methods and/or with different generation controlling parameters. Each of these sets is a section.
Semantics Dense
See Semantics Sparse.
Semantics Sparse
Semantics sparse is loosely defined as: given any arbitrary (finite) sequence of syntactical units, the probability that it is meaningful is low. A high probability (of such a sequence being meaningful) is referred to as Semantics Dense. For ASCII representation of the English alphabet, a syntactical unit is a byte. A (finite) sequence of bytes may or may not form English words or the formed English words may not satisfy the English grammar. A sequence of bytes may not be meaningful even it is syntactically and grammatically correct. For a black-and-white bitmap picture, the syntactical unit is a bit (a one-bit for a black pixel and a zero-bit for a white one). Therefore, English text is semantics sparse while bitmaps are semantics dense. As a side note, scrambled/encrypted data are normally semantics dense. Also see Syntax Sparse and Syntax Dense.
Session Identifier (Id)
A bit sequence communicated during a session and known to all communicating parties but secret to others.
Shielded Mode (of Communication)
In Shielded Mode, much or all of what is communicated that can be encrypted is before being transmitted. Shielded Mode in this invention particularly refers to using session or message specific encryption/decryption keys of a public-key scheme as the shield keys. Also see Bare Mode.
Single-Layer Public-Key Cryptosystem
A public-key cryptosystem that does not encrypt data encryption keys. A cryptosystem may be able to perform both as a single-layer public-key cryptosystem (when in single-layer public-key mode) and as a multi-layer public-key cryptosystem.
Symmetric Key Encryption/Decryption
Encryption/decryption using symmetric keys/methods.
Syntax Dense
See Syntax Sparse.
Syntax Sparse
Syntax sparse is loosely defined as: given an arbitrary bit sequence of the size of a syntactical unit, the probability that the bit sequence is a valid syntactical unit is low. A high probability (of the sequence being a valid syntactical unit) is referred to as Syntax Dense. For English Alphabet represented in ASCII, the probability is lower than 0.21 but for a bitmap the probability is 1. As a side note, scrambled/encrypted data are normally syntax dense. As a matter of fact considering avalanche effect, the size of syntactical units may not stay the same after scrambling and may be drastically increased. Also see Semantics Sparse and Semantics Dense.
Tangible Element
A set element whose presence or absence in any subset sum can be deterministically and efficiently decided. It is also referred to as a tangible.
Time Sensitive Transmission Block
A Time Sensitive Transmission Block is a logical block of data sent from one party to another where the receipt of the complete logical block of data must be within a time frame. An example of a Time Sensitive Transmission Block is a challenge packet transmitted during an identification protocol where the complete challenge packet is expected to be received before a timeout t expires.
Trivial Set (Bag, Vector)
For the purpose of this invention, a trivial set (bag) is one that is either empty or has only zeros as its entries, and a trivial vector is one that either has zero dimension or has only zero value weights.
Unique Set (U Set)
A set X is a unique set (or U Set) if for any arbitrary sets $Y \subseteq X$ and $Z \subseteq X$ the following holds:

$$(sum(Y) = sum(Z)) \Rightarrow (Y = Z)$$

Also see Near-Unique Set and Non-Unique Set.
Unremovable Fuzziness
Fuzziness (resulted from fuzzy residues), internal or external, that can not be removed without additional information of some characteristics of the message (pre-encryption data).
Wrinkling Set
A set of numbers that are added to another set (of numbers) of the same size to disturb some special structure, regularity or inter-dependency of the elements of that other set. The term to wrinkle also refers to the adding of a wrinkling set to another set.

DETAILED DESCRIPTION OF PREFERRED EMBODIMENTS

This invention, in its simplest configuration, consists of at least one encryption device or at least one decryption device, and is capable of performing encryption or decryption. In a general configuration, the present invention will include:

1) at least two crypt units, both coupled to some media referred to as Data Transit Media (DTM), each consisting of an Encryptor E and a Decryptor D 2) a set of Input/Output peripherals (I/O) including secure Data Storage (DS) for each crypt unit
3) a Key Generator (KG) for each crypt unit
4) a Communications Protocol unit (CP) for each crypt unit I/O of the crypt unit consists of devices and peripherals for input and output, as well as secure data storage DS, such as transient memory and hard disks.

KG generates keys based on random or semi-random input. Users can supply passwords which are mapped to the keys generated. Other examples of random input can be: compiled past period hard disk access statistics, user keyboard latency, inputs from sensing devices monitoring random environments, etc. In this invention, the term random will also be used for pseudo-random. In places where true randomness is achievable, this invention recommends the use of it. Pseudo (or semi) randomness is the output from some generator driven by some truly random input.

E performs encryption and D, decryption.

CP provides the interface of the crypt unit to the communications media and handles protocols of the communications between its crypt unit and other crypt units that have access to the same communications media and involve in the communication.

Referring now to the drawings, and more particularly to FIG. 1, there is shown the invention in summary form. Input into Crypt Unit A (A) can be a password or data to be encrypted, or the data to be encrypted can be in media and storage inside A. When, for a simple example where an earlier key establishment was achieved, A is given the instruction to perform encryption and to send the encrypted data to B, A inputs the data into E 11A, has the data encrypted in E 11 and transmits the ciphertext to B via DTM 10. B receives the ciphertext from A and decrypts the ciphertext by D 12B. Recovered data will be output by B. The same operations can also be performed in the other direction, i.e. B encrypts and A decrypts.

Figure 2:
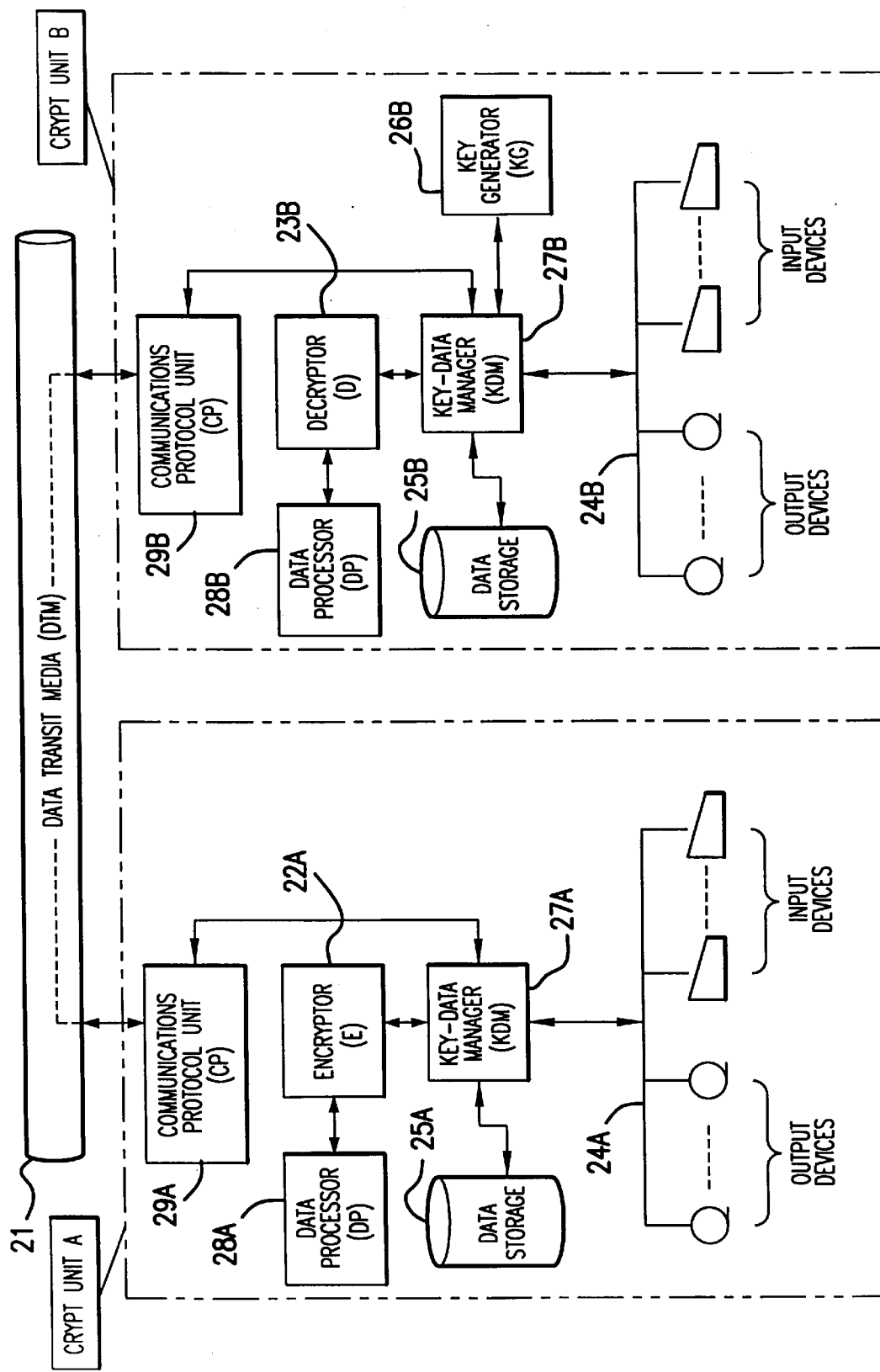
FIG. 2 is a detailed view of the invention in one directional encryption/decryption mode.

FIG. 2 shows a detailed view of the invention in one directional encryption/decryption mode. The large dotted box on the left is the one performing encryption (encryption configuration of Crypt Unit A) and the one on the right is the one performing decryption (decryption configuration of Crypt Unit B).

A initiates, via A's CP 27A, a connection to B requesting a secure transfer from A to B. B grants the connection. KG 26B of B generates a set of keys, stores the private key for decryption and sends the public key via CP 27B to A.

A on obtaining the public encryption key, retrieves data from DS 25A to be encrypted in E 22A. The final ciphertext is passed from E 22A to CP 27A and then sent into DTM 21.

B on receiving the encrypted data via CP 27B decrypts the ciphertext. The recovered data are either stored in DS 25B or output to other devices I/O 24B.

During the session of encryption-decryption, a protocol may be invoked. For example, A may asynchronously tell B that a new fuzzy residue mapping is to be established. Then they both switch to a mode that facilitates the establishment. On completing the establishment, they both fall back into normal encryption-decryption mode, and continue to perform encryption/decryption, using for example the newly established residue mapping.

During the session, A and B may also fall into resolution mode to resolve or partially resolve fuzziness in decryption. When the resolution or partial resolution is complete, they again fall back into encryption-decryption mode and continue to perform encryption and decryption.

Figure 3:
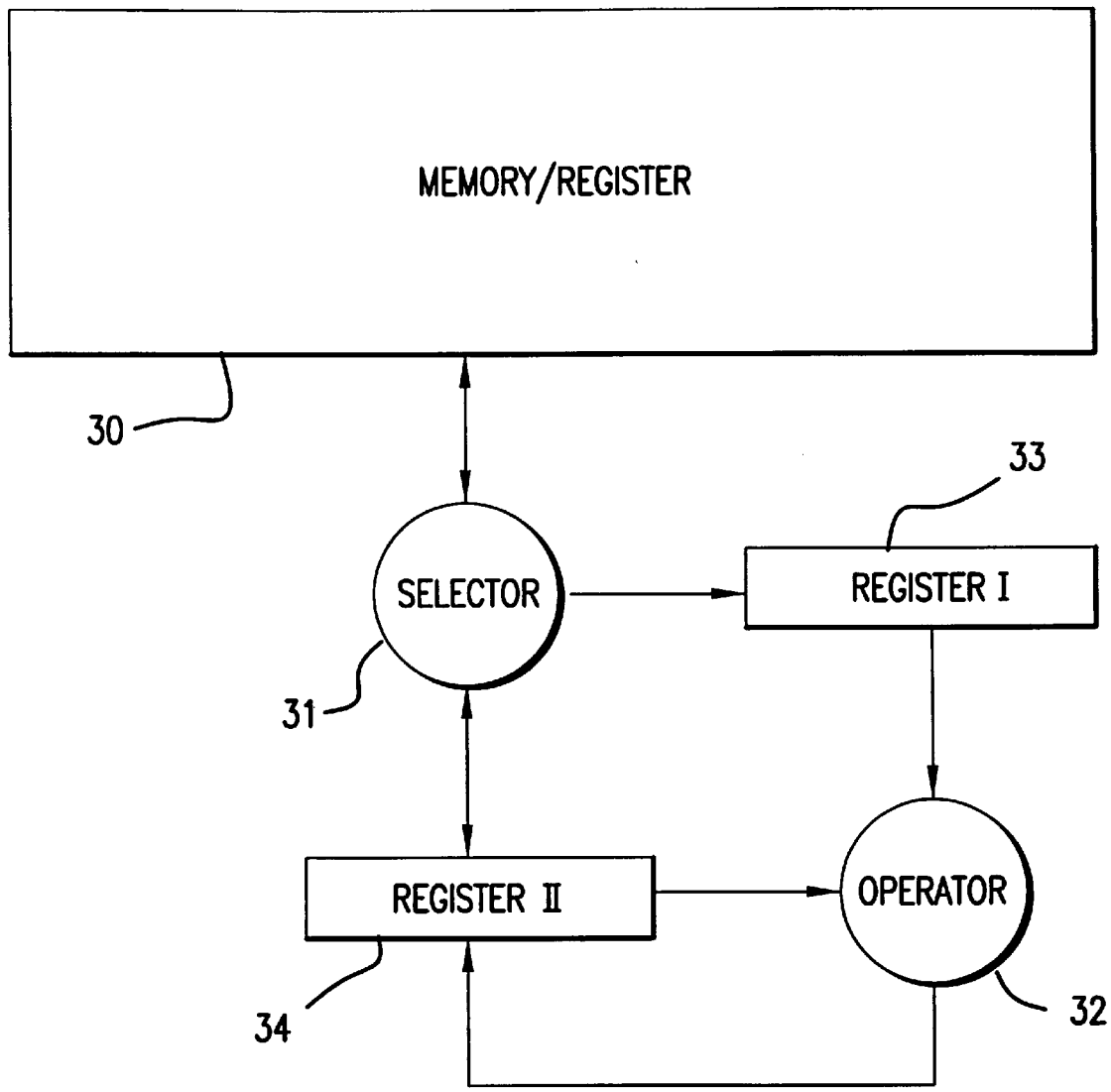
FIG. 3 shows an example of a simple hardware system implementing the invention.

FIG. 3 shows a simple apparatus in which two large registers (possibly large enough to hold the largest number to be manipulated) and some logical circuitry (Operator 32) capable of performing the necessary operations, such as addition, multiplication, etc. Selector 31 is some circuitry that fetches the appropriate values from Memory/Registers 30, a bank of memory or registers, and loads the appropriate register (Register I 33 or Register II 34). After the operation on the values of both registers, the result is loaded back into Register II 34. Then Selector 31 can select the appropriate register or memory location in Memory/Registers 30 to store the result to.

In brief, the present invention uses numbers generated by KG to construct the decryption key, the encryption key and an invertible cryptographic transformation T. The encryption key consists of the encryption key set $K_e$, and possibly a set F of fuzzy residues for encryption. The decryption key is made up of the decryption key set $K_d$, a set G of fuzzy residues corresponding to F for decryption.

Figure 4:
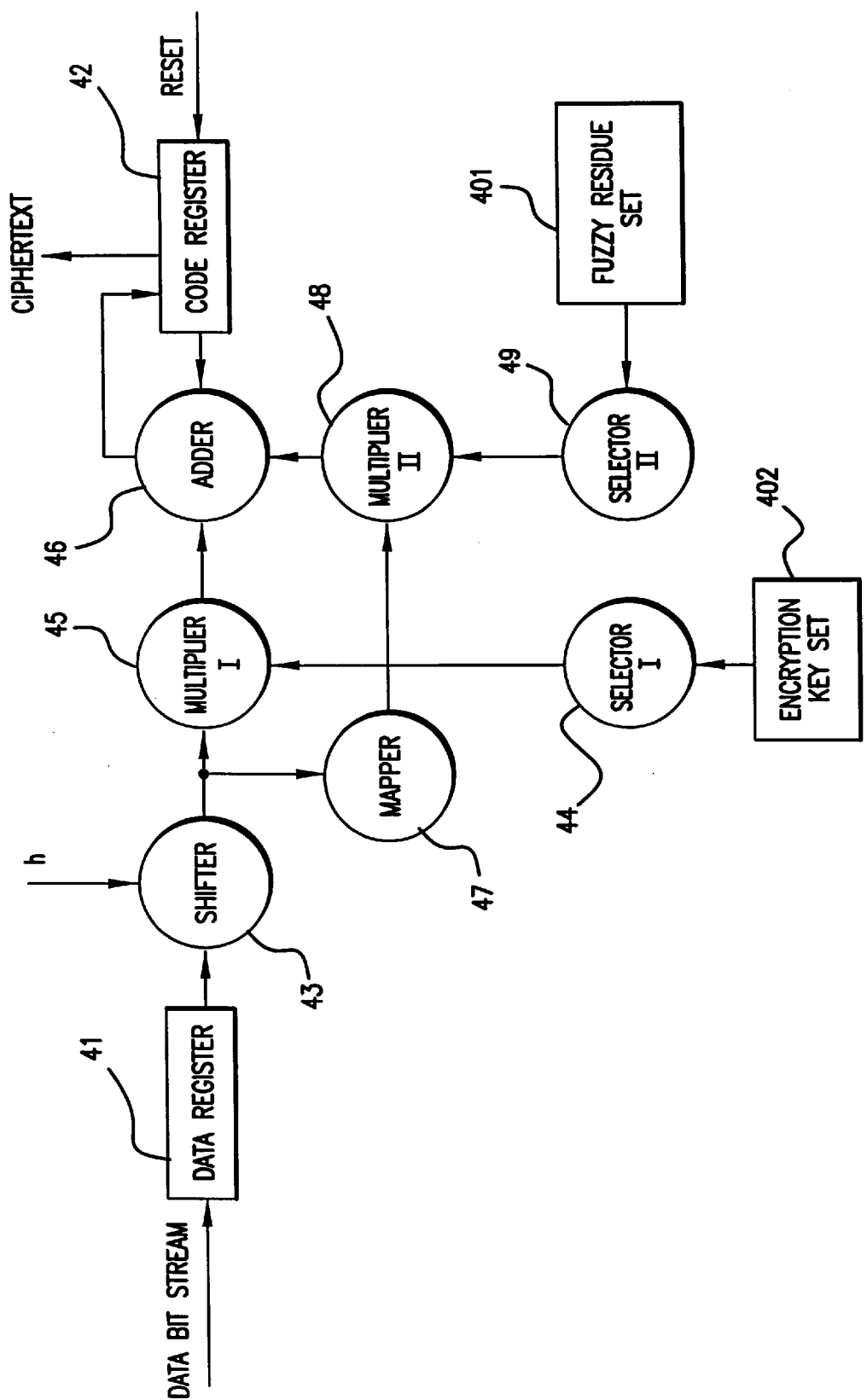
FIG. 4 is a diagram showing the encryptor logic of the invention.

Referring now to FIG. 4, which shows the encryptor logic, data bits are grouped and loaded into Data Register 41. At the same time, Code Register 42 is reset to 0. Shifter 43 is controlled by the parameter h so that each time, h bits are shifted and fed to Multiplier I 45. Selector I 44 will select the appropriate key element from Encryption Key Set 402 to form a product by multiplying it with the value of the habit group in Multiplier I 45, which in turn feeds the product to Adder 46. Meanwhile, the value in Code Register 42 also comes to Adder 46. This way the contents of Code Register 42 are accumulated with the product from Multiplier I 45. At the same time Shifter 43 shifts out the h bits to Multiplier I 45, it also shifts them out to Mapper 47 which maps the value of the h-bit group to an appropriate corresponding multiple. The multiple and the fuzzy residue selected from Fuzzy Residue Set 401 by Selector 49 form a product which in turn is fed into Adder 46 to be applied to the accumulating sum. When all bits have been shifted out from Data Register 41 and Code Register 42 contains the final sum, the result is output as one code of the ciphertext. Selector II 49 is synchronized with Selector I 44 so that the appropriate fuzzy residue from Fuzzy Residue Set 401 is selected by Selector I 49 if Selector I 44 selects a designated element from Encryption Key 402. If the element of the encryption key is not a designated element, Selector II 49 inputs zero into Multiplier II 48, effectively supplying zero to Adder 46 so that it is equivalent to no fuzzy residue being applied.

Encryption is done by taking the encryption key vector $K_e$ and the vector of numbers formed by the grouped data bits to produce the inner product C, the code of the ciphertext. C is just a subset sum of $K_e$ and the elements of $K_e$ corresponding to the non-zero-bit groups will contribute to the subset sum. Fuzzy residues, which do not affect the unique recovery of the original data, may be added to the ciphertext C based on the specifications for the fuzzy residues. As there is an effective and efficient algorithm to single out the numbers that made up the subset sum of the decryption key set, when the ciphertext is inversely transformed to the corresponding subset sum of the decryption key set by $T^{-1}$, the corresponding multiples of members of $K_d$ can be identified, and thus the corresponding non-zero-bit groups, and naturally and trivially the rest zero-bit groups, of the original data can be recovered.

Figure 5:
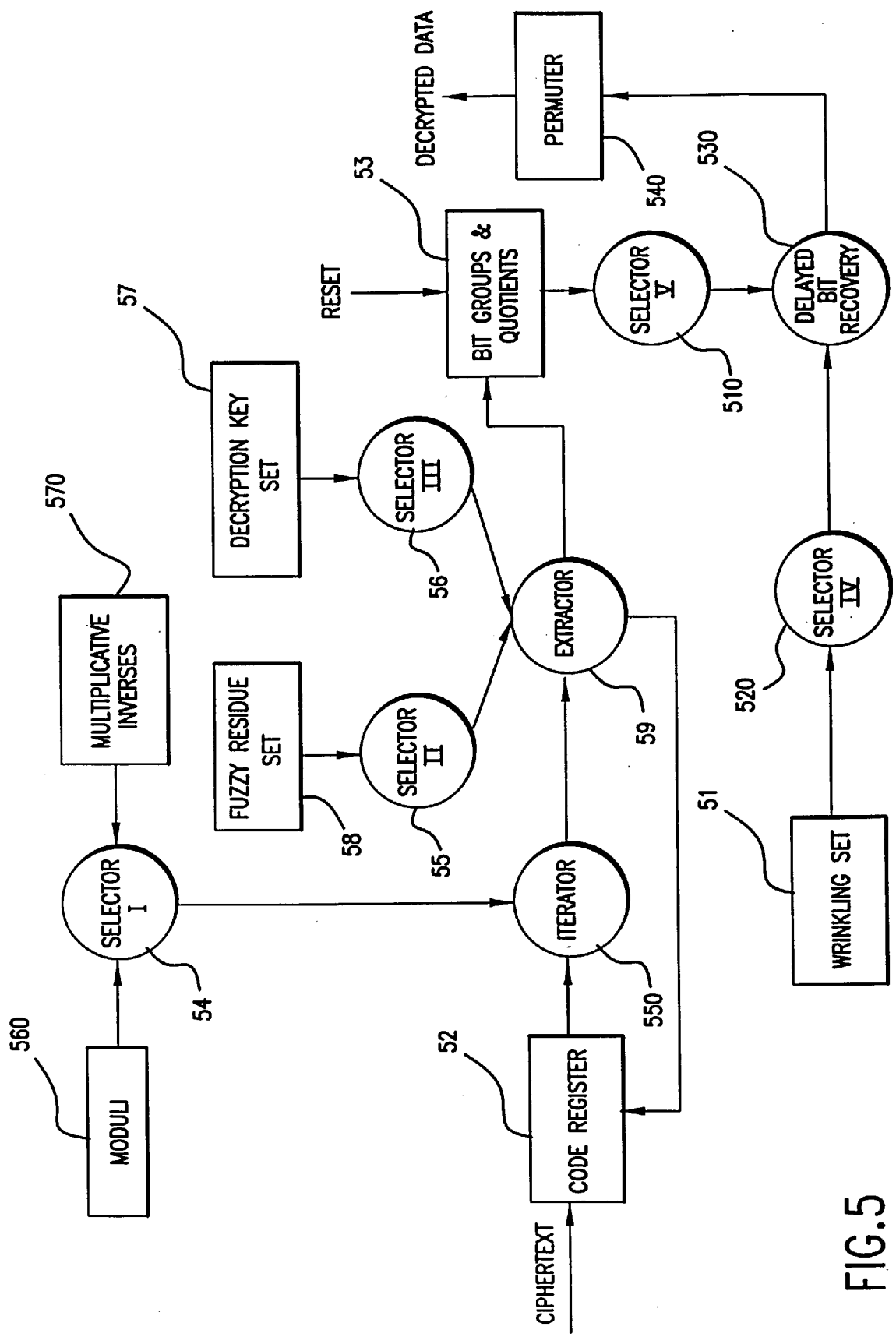
FIG. 5 is a diagram showing the decryptor logic of the invention.

Refer now to FIG. 5, the decryption logic. First the wrinkling set is constructed and loaded into Wrinkling Set 51. Ciphertext is loaded into Code Register 52 one code at a time and each time the registers/memory-cells of Bit Groups & Quotients 53 are reset to 0. Selector I 54 selects the appropriate modulus/multiplicative-inverse pair(s) from Moduli 560 and Multiplicative Inverses 570 respectively and Iterator 550 inverse iterates the code from Code Register 52 using the selected modulus/multiplicative-inverse pair(s). Then Selector II 55 and Selector III 56 are activated to select the appropriate decryption key element from Decryption Key Set 57 and appropriate fuzzy residues from Fuzzy Residue Set 58 to feed into Extractor 59. Extractor 59 extracts the data bits, or a quotient if delayed recovery is needed, and stores them in Bit Groups & Quotients 53. It also sends the partially processed code back to Code Register 52. The process is repeated till all bit groups and their quotients are extracted. Finally, the appropriate quotients selected by Selector V 510 and the corresponding elements in Wrinkling Set 51 by Selector IV 520 are fed into Delayed Bit Recovery 530 to reclaim the rest of the bits that are delayed in recovery. The bits then go through Permuter 540 to be permuted to their right positions before being output as the recovered original data bits.

This invention embraces two configurations for the cryptosystem. The basic configuration, which is referred to as Purely Public Key Scheme (PPKS), does not further protect the actual encryption key and the encryption key may be published. The extended configuration, which is referred to as Quasi Public Key Scheme (QPKS), does not publish or reveal the encryption key as is. Instead, the encryption key as well as other relevant data or cryptographic information are mixed with redundancy or 'garbage' elements that hide the actual key elements. Data may also be so extended using QPKS.

PPKS is specified as follows:

Let S={C, h, I, k, n, P, R, R} be the general definition of the cryptosystem with the following properties:

1) n is the size of the public and private key sets, or the dimensions of the private and public key vectors.
2) k ($1 \leq k \leq n$) is the number of sections for the sectioned key set.
3) P is a permuter (of n numbers), with $P^{-1}$ as the inverse permuter such that for any (finite) sequence X:

$$P(P^{-1}(X)) = P^{-1}(P(X)) = X$$

where P and $P^{-1}$ can be driven by random input or the password.

4) R is a random number sequence generator that produces a sequence of numbers in response to some input seed (number).
5) I={$i_1, i_2, \ldots$} specifies the points, $i_1$, $i_2$, etc., in the system, where the random number generator R is to be re-initialized with a new seed for multi-seeding. The re-initialization points can be driven by the password.
6) R={$r_1, r_2, \ldots$} is a set of couples of numbers used to generate ranged numbers. The couples are the inclusive lower and upper bounds of the ranges.
7) C={$c_1, c_2, \ldots, c_k$} is a set of k numbers used to control the wrinkling effect.
8) h>0 is a natural number that specifies the number of data bits to be grouped to form vector elements for encryption.

The following parameters may also be generated by or specified to the cryptosystem:

1) Z={$z_1, z_2, \ldots, z_k$} is a set of k non-zero natural numbers where sum(Z)=n. The $z_i$, for $1 \leq i \leq k$, is the size of the ith sectioned key set.
2) G={$g_{1.1}, g_{1.2}, \ldots, g_{i.1}, g_{i.2}, \ldots$} is a set of decryption fuzzy residues.
3) F={$f_{1.1}, f_{1.2}, \ldots, f_{i.1}, f_{i.2}, \ldots$} is a set of encryption fuzzy residues.

4) For each section the following are specified or generated:

4.1) $t_i$ specifies the total number of iterations that will be performed on the (partially if i<k) constructed key set and the fuzzy residue set.

4.2) $M_i$={$m_{i.1}, M_{i.2}, \ldots$}, $W_i$={$W_{i.1}, W_{i.2}, \ldots$} and $W_i^{-1}$={$W_{i.1}^{-1}, W_{i.2}^{-1}, \ldots$} are each a set of $t_i$ numbers, where each $m_{i,j}$-$w_{i,j}$ pair is used to perform an iteration, $M_{i,j}$ is so selected that inverse iterations will not introduce ambiguity. For example, $m_{i,j}$ is larger than $2^h - 1$ times the sum of all the numbers in the set(s) to be iterated, ($m_{i,j}, w_{i,j}$)=1 and $w^{-1}_{i,j}$ is the multiplicative inverse of $W_{i,j}$ modulo $m_{i,j}$, for $1 \leq j \leq t_i$. The $m_{i,j}$-$w_{i,j}^{-1}$ pair is used to perform inverse iteration. In the case where G is to be iterated also, $m_{i,j}$ will be selected with G in the consideration. For example, $m_{i,j}$ is larger than the sum of the maximum multiples of all so far generated and iterated key set and residue set elements.

If $c_i > 0$, the following, pertaining to section i, may also be generated:

4.3) $q_i$, the number of elements of the ith section (sectioned key set) to be wrinkled where $q_i \leq z_i$. I.e. the number of non-zero elements of the wrinkling set.

4.4) $B_i$={$b_{i.1}, b_{i.2}, \ldots$} is the wrinkling set (of ranged numbers) of size $z_i$ corresponding to the ith key section. The wrinkling set is to disturb the regularity of the set it is applied to.

5) FM( ) is an invertible fuzzy residue mapping function for both encryption and decryption. Through the transformations, the decryption fuzzy residue set is transformed to the encryption fuzzy residue set, but the encryption key inherits the fuzzy residue mapping by retaining the same mapping defined and specified for the decryption key so that the association between any encryption key element and its mapped encryption fuzzy residue element is the same as the association between the corresponding decryption element and its mapped decryption fuzzy residue element.

Except possibly M, W, $W^{-1}$ and F, a parameter can be any of the following:

1) be specified for the system and stay constant
2) be specified at will whenever desired, as variables controlling both the system and the keys generated
3) be generated by the system driven by random input
4) be given ranges so that the system generates values for the parameters that fall within the specified ranges.

It should be obvious to anyone skilled in the art that the system can be vulnerable if all other parameters, except M, W, $W^{-1}$ and F, are constant.

A simplified way of generating the public encryption key and the private decryption key is described in the following example process:

1) Let A and X start as empty sets.
2) generate $B_1$ through $B_k$, the wrinkling sets
3) for (i=1; i$\leq$k, i++)
   {
4)   generate $A_i$={$a_{i.1}, a_{i.2}, \ldots, a_{i.u}$}, a key section
5)   add $b_{i,j} * c_i$ to $a_{i,j}$ (wrinkle section $A_i$)
  /* if $c_i$=0, $A_i$ is not changed */
6)   $X_i < A_i$
7)   $B_i < 0$
8)   $A < (A \cup A_i)$
9)   $X < (X \cup X_i)$

```
    10)  iterate X  t_i times
    11)  iterate B  t_i times
       }
    12) Let K_e be the permuted X by P
```

In step 4), $u=z_i$.

In step 6) after the assignment, elements of $A_i$ can be effectively and efficiently identified and singled out from any subset sum of members of the so-far-con-structed X.

Fuzzy residues can be generated during the above described process.

$K_e$ is the public encryption key set, and a subset of F, if applicable, is also part of the public key.

$A_l$ through $A_k$ (or A) and all the parameters for the reverse transformation are the private key, where A is the private key set.

Data to be encrypted are represented in binary form and grouped into n numbers, each formed by h bits. So each n*h-bit group can be turned into one code of the ciphertext. Encryption is done by forming the inner product of the encryption key vector and the n numbers taken as a vector, producing a subset sum of the encryption key set with the numbers in the encryption key set corresponding to the non-zero h-bit groups contributing to the subset sum, and some fuzzy residues may be added in the process of forming the subset sum.

Decryption is to perform the inverse transformation on the ciphertext to recover the original data bits. As the code goes through the inverse transformation, the elements of $A_k$ down to $A_1$ corresponding to those of $K_e$ contained in the subset sum can be identified, as well as any contained fuzzy residues. Once the elements of the private key and any fuzzy residues are identified, they are subtracted from the being decrypted code of the ciphertext, and the corresponding non-zero-bit groups are remembered. Finally, all non-zero-bit groups, and naturally and trivially the rest zero-bit groups, can be recovered. After discarding unwanted residue (s), if any, and applying the inverse permutation $P^{-1}$, the original data bits are obtained.

This invention employs various construction methods and different values for system parameters, giving the generated public key, and as a result the cryptosystem itself, different characteristics.

According to one feature of this invention, the key can be designed to accommodate residue or noise in subset sums. In particular, when the decryption key set is superincreasing for example, noise of up to x−1 may be tolerated if $a_{1,1}$ equals some natural number y and $a_{1,2}$ equals some natural number x+y. That is, numbers whose sum is at most x−1 can be iterated by the same parameters as those used in the private-key-to-public-key transformation and can be added to any subset sum of the public key set without affecting unambiguous decryption. This is the Residue Public Key Method (RPK or RPKM). In general, residue or noise can be numbers that when added to a subset sum do not affect the unique solution of the subset sum. Therefore, identifiables can be used as residues.

According to another feature of this invention, when one or more $c_i$'s are greater than 0, certain otherwise inherited regularity of the public key set, can be disturbed. For example, with $c_i$ greater than 0, the property of a superincreasing $A_i$ can be disturbed. In particular, if in applying the disturbances the resulting key set remains a unique set of identifiables, the application is the Wrinkled Public Key Method (WPK or WPKM).

According to still another feature of this invention, when k is greater than 1, the public key set is in essence generated in sections that may be generated by different construction methods and may go through a different series of modular multiplications and transformations. This is the Sectioned Public Key Method (SPK or SPKM).

According to yet another feature of this invention, residues can be so designed and applied that unique decoding and in particular single solution decoding is not guaranteed for attack-on-code cryptanalysis. This is the Fuzzy Public Key Method (FPK or FPKM). Fuzziness can be built into the encryption key set where, as in WPKM, each key set element is added by an integer—the application of a blurring set—resulting in a non-unique key set. Fuzziness can also be introduced by a separate fuzzy residue set where both the fuzziness (or the 'amount of residue') and the way fuzziness is applied is related to the data being encrypted.

In particular, the generalization of RPKM in conjunction with WPKM is of interest. Assume that the union of so far generated and iterated u sections contain $a_1, \ldots, a_2, \ldots, a_m$ and section u+2 is of size t. Next identifiables $a_{m+1}, \ldots, a_{m+s}$, are generated and $a_{m+1}$ through $a_{m+1}$ through $a_{m+s-t+1}$ are the elements of section u+1, where s>t.>1 Then $a_1$ through $a_{m+s}$ may be iterated to $b_1$ through $b_{m+s}$ respectively before generating the first superincreasing identifiable x of section u+2. The rest of the elements of section u+2 are: $x+b_{m+s-t+2}, x+b_{m+s-t+3}, \ldots, x+b_{m+s}$.

QPKS is specified as follows:

Let S={C, h, I, k, n, P, R, R} be the general definition of the cryptographic system with the following properties:

1) n is the size of the extended sets.

2) I={$i_1, i_2, \ldots,$} specifies the points, $i_1, i_2$, etc., in the system, where the random number generator R is to be re-initialized with a new seed. The re-initialization points can be driven by the password.

3) k is the message unit size that controls how the to-be-extended binary block is broken down in to smaller pieces, each as a single element in an extended set.

4) P is a permuter (of n numbers), with $P^{-1}$ as the inverse permuter such that for any (finite) sequence X:

$$P(P^{-1}(X))=P^{-1}(P(X))=X$$

where P and $P^{-1}$ can be driven by random input or the password.

5) R is a random number generator that produces a sequence of numbers in response to some input seed (number).

6) R={$r_1, r_2, \ldots$} is a set of couples of numbers used to generate ranged numbers. The couple are the inclusive lower and upper bounds of the range.

7) C is a set of (enumerations of) classification methods used for the construction of partially tangible (extended) sets, and a (random) selection of any one of them can be applied for the extension of sets for an instance of encryption.

8) h>0 is a natural number that specifies the number of data bits to be grouped to form vector elements for encryption.

In general, the extended sets can be of different sizes.

The binary bit block to be extended will be first broken into pieces. It can be broken down in a couple of ways: of exactly k bits, of at most k bits, or of about k bits a piece. However, if all the pieces are of exactly k bits, it may not be secure. If the pieces are of variant sizes, a redundant one-bit will be added to the front of the pieces to 'shield' the leading zero-bits. Such pieces are referred to as message units. Then an m-tangible set of n numbers (where n≧m) for each message unit is generated such that, when they are transformed, one of the tangibles is transformed to the message unit. The set may then be permuted. If the tangible has its entry in the extended key vector randomly selected, no permutation is needed.

The receiver of the extended sets will form a different subset sum for each extended set to send to the sender/constructor of the extended sets. A positive notification (confirming the containment of the message unit in the subset sum) from the sender of the extended sets indicates those not used in forming the subset sum are all non-message units. Otherwise, a negative notification indicates that those used to form the subset sum are all non-message units. Therefore, the elements that are not message units of the extended set will be identified in groups and when finally all non-message units are identified, the message unit is naturally and trivially identified. After all the pieces of the original bit block are identified and concatenated, with the redundant leading one-bits removed, the original block is recovered.

When QPKS extends a key alone, it is the Constant Lower Layer Method (CLL or CLLM), so called because the cryptographic method of the encrypted key is made known and the receiver of the extended key sets needs to know, after obtaining the key, of what cryptographic method the key is, so it can use the key to perform encryption. Obviously, the receiver can be confused if it can receive more than one type of indistinguishable cryptographic keys.

Another method, Variant Lower Layer Method (VLL or VLLM), can include all necessary information about what QPKS extends, plus possibly other useful information that needs be protected. An example of the realization of VLLM can take the following format for the block to be extended:

<alternate pad><type><start><stop><random insert><key><trailing pad> where:

<alternate pad> is to make the position of <type> random if <alternate pad> is generated randomly.

<type> is the enumeration of the types of cryptographic methods (keys) the cryptosystem will use in the lower layer(s). E.g. 1 can represent DES, 2 can represent data, 3 can represent PPKS with n=16 and h=8, and 4 can represent PPKS with n=16 and h=16, etc.

<start> is the position of the first bit of <key> in the block, counting from the first bit of <type>.

<stop> is the position of the last bit of <key> in the block counting from the first bit of <type>. If the size of <key> can be calculated or derived, <stop> can just contain random bits.

<random insert> is a group of random bits inserted in front of <key> to make the starting position of <key> random. The size of <random insert> in bits is the value of <start> minus the size (in bits) of <type>, <technique>, <start> and <stop>, which are all constant in size, and the value of <start> is the size in bits of <type>, <technique>, <start>, <stop> plus a ranged random number, which is the number of random bit insert before <key>.

<key> is the key of a certain cryptographic method, or possibly data, to be extended.

Although syntax sparse or semantics sparse data are not secure using QPKS directly, yet such data can always be processed first by some simple, fast scrambling operations, such as Backward-and-Forward Scrambling, to make them dense in syntax and semantics.

<trailing pad> is optional random bits to hide the true end of <key>.

In QPKS, the subset sums are generated in basically the same way as in PPKS by the receiver of the extended sets, i.e. taking the inner product of the extended vector and the vector formed by the bit groups of data. The difference is that, for QPKS, the bit groups are not 'pre-determined' data. Random bit groups will better serve the same purpose. However, in QPKS, different elements from the extended set will be chosen to form the subset sums.

The decryption process of QPKS is essentially the same as that of PPKS except that QPKS may not need to identify all elements that contributed to the subset sum. It may only need to determine if the tangible of interest is contained in the subset sum.

The point of interest for QPKS is how a block of (to-be-encrypted) bits is broken down into pieces and how a tangible in an m-tangible set is transformed to it.

For VLLM, the block will have some specific format as the example format of VLLM given in this invention and can be applied BFSM first. For simplicity, it is assumed for the following example that the block is just:

ENGLISH☐OR☐GREEK where ☐ stands for a blank space. The ASCII binary representation is:

```
0100 0101 0100 1110 0100 0111 0100 1100
0100 1001 0101 0011 0100 1000 0010 0000
0100 1111 0101 0010 0010 0000 0100 0111
0101 0010 0100 0101 0100 0101 0100 1011
```

The bits are given four in a cluster for easy reading. It is further assumed that the bits are to be grouped in size of about k=32, and a random sequence is generated for this purpose: 30, 31, 34, 33, 32, . . . , then the grouped bits will be:

| | |
|---|---|
| 0100 0101 0100 1110 0100 0111 0100 11 | (30 bits) |
| 00 0100 1001 0101 0011 0100 1000 0010 0 | (31 bits) |
| 000 0100 1111 0101 0010 0010 0000 0100 011 | (34 bits) |
| 1 0101 0010 0100 0101 0100 0101 0100 1011 | (33 bits) |

As there can be leading zeros for grouped bits (all but the fourth bit group of the above example), they need to be protected from being lost in the identification process where they are turned into numbers with leading zeros ignored. For this purpose, a one-bit is added to the front of all the groups as the most significant bit so that the bit groups will then be:

```
10100 0101 0100 1110 0100 0111 0100 11
100 0100 1001 0101 0011 0100 1000 0010 0
1000 0100 1111 0101 0010 0010 0000 0100 011
11 0101 0010 0100 0101 0100 0101 0100 1011
```

When the bit groups are identified, the leading one bit of each group is stripped to get the original bits.

The extending of the first piece of the block, 10100 0101 0100 1110 0100 0111 0100 11, which will be referred to as d for the convenience of explanation, is demonstrated next. It is assumed that h=2 and an extended 1-tangible set is generated:

$E = \{e_1, e_2, \ldots, e_n\}$

The set can be unique, near-unique or with fuzziness applied by using a fuzzy residue set and fuzzy residue mapping while maintaining the tangibility of the tangible to be transformed to d. For this simple example, it is assumed that no fuzzy residue is applied.

It is further assumed that $e_2$ happens to be relatively prime to 5 and, applying the concept of closure of scaled set, each of the rest of the elements in E that is relatively prime to 5 is multiplied by 5. Then the extended set is iterated twice to produce $G = \{g_1, g_2, \ldots, g_n\}$.

It can be determined whether $g_2$ is contained in a subset sum x of G after the subset sum is inverse iterated to the corresponding subset sum y of E. This is because if $g_2$ is used to construct x, then $e_2$ is contained in the corresponding y which is inverse iterated from x. In that case, when y is divided by 5, there will be some non-zero remainder. If $g_2$ is not used in constructing x, y will divide 5.

If G is iterated once more and $g_2$ is transformed to d, then the iterated version of G is a set whose subset sums containing d are able to be inversely transformed back to the corresponding subset sums of E containing $e_2$, the tangible.

First a number $m > sum(G)*(2^h - 1)$, $m > d$ and $(m, g_2) = 1$ is chosen. Then $g^{-1}_2$, the inverse of $g_2$ modulo m is calculated. Finally, $w = (g^{-1}_2 * d) \Xi m$ is obtained. As $(g_2 * w) \Xi m = (g_2 * g^{-1}_2 * d) \Xi m = (1 * d) \Xi m = d$, the iteration by m-w will transform $g_2$ to d. To guarantee that the multiplicative inverse $w^{-1}$ exists (so that the inverse transformation does not create non-unique decoding), it is necessary that m and d be also relatively prime.

It should be obvious to anyone skilled in the art that the magnitude of d is related to that of m, and a too small d in the midst of large elements of the iterated G, for example, exposes d.

QPKS differs from prior art public-key cryptosystems/schemes in a special way: no data or encryption keys embedded in the extended sets are readily available to cryptanalyses or attacks. Until the commencement of the protocol for the receiver of the QPKS extended key sets to identify the key/data elements, the extended key sets themselves offers little for cryptanalyses to exploit, given that the block extended is syntax and semantics dense.

Methods to be introduced next are to provide improved security, higher information rate, and more robustness of this invention.

Key generation of this invention may in part rely on numbers or sequences of numbers generated by a random number generator. It is essential that the sequences generated and used in the construction of private and public keys be not revealed even though the characteristics of the generator is publicly known. A sequence generated by a random number generator will be determined by the initial stage of the generator, which is usually set by a seed or number fed to it. Without the knowledge of the seed, it is difficult to learn what sequence of numbers can be generated. However, the sequence can be exposed if the number of seeds the generator can take as unique is small and/or the sequence generated by the initialization of a single seed is long enough. This is because if the possible unique seeds are not many, all possible seeds can be tried to see which seed results in the sequence or in the keys constructed from the sequence. If the sequence generated with one particular seed is long, the sequence itself might expose some characteristics of the sequence, helping the cryptanalyst to deduce the seed.

KG and some other mechanisms of this invention employs the following efficient methods to defeat the feasibility of the attempt at the keys via a breakthrough from the random number generator:

1. Segmented sequences
2. Reassembling of fragmented/fractured numbers
3. Multi-seeding
4. Re-seeding
5. Combinations of any of the above 4.

Segmented sequences are sequences formed by sections from a sequence or sequences. For example, the 3rd through the 7th and the 101st through the 110th numbers from one sequence may be joined with the 999th number from another sequence to form a new, segmented sequence.

Reassembling of fragmented/fractured numbers is the method of taking 'digits' from one or more numbers, with or without some manipulations on them, to form a new number. For example, given a decimal number 9837523642, the last digit, then the 5th, then the sum of the first and the last can be taken to form a new number 2511.

Multi-seeding is the notion of selecting many initial stages (seeds) for the random number generator to generate more than one sequence and to join sections of the sequences to form a new sequence, while keeping the length of the sections secret. In other words, it may be randomly decided when to stop taking numbers from one sequence and to start with another sequence. The seeds can be random input from the user or other sources. It should be trivial and obvious to one skilled in the art that segmentation, fragmentation and multi-seeding can be directly associated with passwords rather than an invariant part of the cryptosystem or the random number generator.

Re-seeding is to scramble certain seeds or the output driven by the seeds and to used the scrambled output as new seeds. In particular, seeds can drive expand hash functions using multi-seeding, then (sections of) the expanded output can be scrambled and compress hashed to produce new seeds.

In an alternate embodiment for password-to-key mapping, a system default, i.e. a default bit sequence of length zero or more, can be used to blend with the user password in a defined way and the seeds are the result of a scrambling function with uniformly distributed output. The seeds are then used as input to an expand hash function and a pseudo-random sequence can be generated with appropriate ranges applied. The pseudo-random numbers can be used as parameters in various ways to drive cryptographic key generation, such as prime generation and the indexing used in Universal Virtual One-Time Pad.

Universal Virtual One-Time Pad (UVOTP) is an extended concept of the conventional One-Time Pad with the pad or a set of pads standardized and publicly known. A secret indexing is generated driven by some random input to pick pseudo-randomly from the pad for XORing the message into ciphertext. An example illustrates UVOTP here. Assume that 300 random input bytes or a stream of 2400 bits are accepted. First bits are reversed in order, then they are scrambled by some non-compressing hash function whose output is uniformly distributed. The scrambled bits B, still 300 bytes, are taken as one large number in binary representation and divided by 150 resulting in a remainder z. B is regrouped into 150 double-bytes $d_1, d_2, \ldots, d_{150}$. A sequence $a_1, a_2, \ldots, a_8$ within the inclusive range of [1,150] is then generated by R, a pseudo-random number generator, initialized by $d_z$. Finally, 8 sequences are generated in the following manner:

$s_1, s_2, \ldots$ by R$\Xi$2 with $d_y$ as the initialization seed where $y = a_1$ $p_1, p_2, \ldots$ by R with $d_y$ as the initialization seed where $y = a_2$ $n_1, n_2, \ldots$ by R with $d_y$ as the initialization seed where $y=a_3$ $x_1, x_2, \ldots$ by R with $d_y$ as the initialization seed where $y=a_4$ $b_{1,1}, b_{1,2}, \ldots$ by R with $d_y$ as the initialization seed where $y=a_5$ $b_{2,1}, b_{2,2}, \ldots$ by R with $d_y$ as the initialization seed where $y=a_6$ $b_{3,1}, b_{3,2}, \ldots$ by R with $d_y$ as the initialization seed where $y=a_7$ $b_{4,1}, b_{4,2}, \ldots$ by R with $d_y$ as the initialization seed where $y=a_8$ as well as 142 pairs of numbers $(\alpha_1\beta_1), (\alpha_2, \beta_2), \ldots, (\alpha_{142}, \beta_{142})$ driven by $e_1, e_2, \ldots, e_{142}$ respectively, where $2^8-1 < \alpha_i < \beta_i$ for $0 < i < 143$ and the sequence $e_1, e_2, \ldots, e_{142}$ is the sequence $d_1, d_2, \ldots, d_{150}$ with the $d_y$'s removed, where $y=a_1, a_2, \ldots, a_8$. The message is encrypted to ciphertext by XORing the ith byte of the message with a byte value defined by:

$$(i*(\alpha_j+p_i)\boxminus\beta_j)\boxminus 2^8 \text{ if } s_i=0,$$

and $$(i*(\alpha_j+i)\boxminus\beta_j)\boxminus 2^8 \text{ otherwise}$$

where $j=(b_{y,i}\boxminus 142)+1$ for $\gamma=x_i\boxminus 4$. Decryption is the same as encryption by XORing the bytes in the ciphertext. The basic concept can be implemented with many indexing schemes and the units for XORing can be any number of bits instead of the 8-bit byte shown in the previous illustration. In fact, the pad is 'virtual' and if the number $2^8$ is replaced by $2^c$, the example is generalized to a virtual pad of c-bit units.

To secure the data encrypted from partial exposure, this invention introduces two other methods: Backward-and-Forward Scrambling Method (BFS or BFSM) and Expanded Data Block Method (EDB or EDBM).

The idea of BFSM is to scramble the data block in both directions in addition to performing encryption on it. Pairs of functions, scrambling functions F and B and their corresponding descrambling functions $F^{-1}$ and $B^{-1}$ are used where $F^{-1}$ and $B^{-1}$ have the property that for an input in the form a sequence of bits $b_1b_2\ldots b_n$, in order to descramble $b_i$ for $1<i\leq b$, m $b_j$'s for $j<i$ need to be descrambled first. In order to foil brute force attack, m should be large in general when m>i, and is recommended to be at least 128, Either backward scrambling or forward scrambling may be applied first. An example is the LZW compression function as F and the LZW decompression function as $F^{-1}$, assuming the input is compressible. Another example is the use of DES where immediate previous bits are used as key to encrypt the following bits and there is an initial key, similar to the idea of initialization vector, for the first encryption of the input. Even though DES is used, the initial key is not required to be kept secret as the requirement for the processing is a scrambling function and not necessarily an encryption function. However, different initial keys are required for each scrambling operation if DES is used, or in a general sense, the scrambling operations elected should not cancel each other out.

To apply backward scrambling, the input bit sequence can be first reversed, i.e. $b_1b_2\ldots b_n$ becoming $b_nb_{n-1}\ldots b_1$, and then scrambled, or the bit sequence can be first grouped into units of size suitable for the scrambling function and then the units order reversed before applying scrambling. After the scrambling processing, the bit sequence or unit sequence is again reversed. Descrambling reverses the input the same way.

A generalization of BFSM is to use permutation and scrambling operations that enforce full block dependency instead of the more specific reverse operation. For example, if the input size in bits is m, then swapping bit i with bit m−i+1 for 0<i<129 can provide full block dependency with proper scrambling operations applied in the proper order in chaining mode.

Since the larger the data block the less the effective success rate of attack-on-code cryptanalysis directly on ciphertext when the code level success rate of cryptanalysis is less than one, if it is guaranteed that the data block be of some suitably large size, the security of the encrypted block can be improved when BFSM is applied. To ensure a large enough block can be formed, the data block can be expanded by embedding redundant bits. For example, some expansion method similar to that defined for VLLM can be adopted, with enough bits, other than the true data bits, inserted/embedded to expand the block to the desired size. This technique is EDBM.

Both BFSM and EDBM can be applied to QPKS and PPKS, but they are not limited to this invention. Any cryptographic method threatened by only partially successful attack-on-code can apply BFSM and EDBM to improve the security of the cryptosystem.

Feedback mode (stream cipher feedback or block chaining), which is some type of scrambling in essence, can also be used at various levels. At code level, each code is used to scramble the next message unit, or each message unit is used to scramble the next code. The former is referred to as glued and the latter linked. This invention recommends the use of linked feedback. Code level feedback will stop at the boundary of blocks. At block level, the last message unit (or its code) of the previous block communicated is used to scramble the first code (or message unit) of the next block. At session level, feedback persists from session to session, e.g. utilizing session identifiers. Feedback is affected by the avalanche effect, which is change in bits of the succeeding codes (and thus the decodes) affected by the change of any single bit of the current code/decode. Avalanche effect has two parameters: length and width. Length refers to the number of succeeding codes/decodes affected and width refers to the number of bits in each of the succeeding codes/decodes affected. The larger the width, the more security provided. If the length is constant or is bounded by some maximum, it is called limited (avalanche) length. If the length is not bounded by any maximum, i.e. all succeeding codes/decodes are affected, it is called unlimited (avalanche) length. This invention can adopt both stream ciphers and block ciphers with any avalanche effects for feedback.

An alternate form of applying BFSM is to make use of feedback mode. Since feedback is in essence a type of scrambling in a chaining fashion, it can be utilized as one of the bi-directional scrambling operations, e.g. data are first scrambled backward with one type of scrambling and the scrambled version is then encrypted in feedback mode.

In still another embodiment, for each instance of encryption where the scrambling operations are not standardized but dynamically elected, the specification of the bi-directional scrambling can be appended at the end of the scrambled data, and sent encrypted in linked feedback mode. It should be obvious to anyone skilled in the art that, to enhance security, encryption may take the general form E(K(M)·K) when it is not required that decryption of M must start before the entire E(K(M)·K) is obtained, where K=H(M)·r for some one-way hash function H and some random bits r. K(M) is some fast symmetric encryption by K as the key, and H(M) is H operating on a message M, but not necessarily on the entire M.

A session identifier is a bit sequence of length zero or more that is communicated during a secure session. For example, if during a session a file is encrypted and sent from one party to another, then the parties can decide on any bits in the binary representation of the file to be the identifier for that session. There will be some maximum that controls the FIFO (first-in-first-out) queue of the session identifiers. When the maximum is reached, the oldest identifier is discarded and the new one is added to the end of the queue. Session identifiers can be used in various ways to enhance security. For example, the communicating parties can agree on a random salt for a session and use the compress hash on the concatenation of the session id's to produce a symmetric key to encrypt a lower layer. In formal identification, the session identifiers in their 'raw' form or preferably in a processed/hashed form can be requested as part of the entire challenge. In particular, all identifiers can be requested in forming the reply to the challenge, or selected ones can be requested, or even subsequence of the bits of all or selected identifiers can be requested in either the 'raw' form or preferably in a processed form as the reply to the challenge.

Fuzzy residue in this invention is to greatly escalate the complexity of attack-on-code cryptanalysis. The various methods introduced in the following paragraphs include fuzzy residue indexing (mapping), removable and unremovable fuzziness, key element designation (for the indexing of fuzzy residues), reflexive dependency of message units, and the use of blurring sets.

An example of fuzziness is a zero-one set $\{1, 2, 3, 7, 11\}$. Given a number 10, it can be the subset sum of 1, 2, and 7, or the subset sum of 3 and 7. Without more specific characteristics of the set, the fuzziness is unremovable, i.e. there is no way to tell which of the two combinations, 1-2-7 or 3-7, is the correct decode for the given number 10. If in addition there is the rule that either 3 or 7 but not both will have to be in any subset sum, the fuzziness is removable. In this particular example, 10 can only be decoded to 1-2-7 because the decode 3-7 will have violated the rule. There can be other types of removable fuzziness, e.g. sparse syntax and semantics of the original data can help remove much or most and likely all of the fuzziness. The key set can be designed and constructed in such a way that the designer/constructor can efficiently find out the correct decode in a removable fuzziness case or all possible decodes in an unremovable fuzziness case. The 'amount' of fuzziness can also be controlled based on how the set is constructed. E.g. the set $\{1, 2, 3, 7, 11\}$ is 25% fuzzy, i.e. out of 100 (arbitrary) subset sums, there will be 25 on average that can be decoded in more than one way. If the set is $\{1, 2, 5, 10, 18\}$, it is 3.125% fuzzy. If the set $\{1, 2, 3, 7, 11\}$ is transformed to two sets: a zero-one set $\{1, 2, 7, 11\}$ and a fuzzy residue set $\{0, 3\}$. The fuzziness is removable with the mapping (indexing) rule that the subset sum is added 0 if the data bit corresponding to 7 is 1, and is added 3 otherwise.

Indexing and mapping of the fuzzy residues can take various forms. One straightforward way is to designate key elements to map to elements in the fuzzy residue set. As a simple example, the designation of a single key element is illustrated next. It is assumed that k of the n elements of the entire key set are generated, where k<n, and that the next element is the first in the set to be designated for fuzzy residue mapping. Let h=4, and generate a set of random numbers $F=\{f_1, f_2, \ldots, f_{16}\}$. The next element is generated the following way:

$$a_{k+1} = \text{sum}(A) * (2^h - 1) + \max(F) + R$$

where R is the ranged random number generator that will produce some suitable number and $A=\{a_1, a_2, \ldots, a_k\}$ is the set containing all key set elements before $a_{k+1}$ is generated. Fuzzy residues are applied in the following way: if x is the value of the bit group corresponding to $a_{k+1}$, then $f_{x+1}$ is added to the subset sum.

As an example, it can be specified for one instance of encryption that if the bit group value of a designated element is 1, 3 times a certain fuzzy residue will be added; and if the value is 2, 5.5772 times the fuzzy residue with a limited precision will be added; if the value is 3, 0 time the fuzzy residue will be added, etc.

Furthermore, a set of less than $_2$ h residues can be added to the subset sum by some special pre-defined or agree upon mapping where such agreement is reached by a protocol carried out in shielded mode. For example, given a fuzzy residue set: $\{5, 6, -2, -1\}$, 5 is added to the subset sum if the corresponding bit group value is a multiple of 4; 6 is added if the value divided by 4 leaves a remainder 1, -2 is added if the value divided by 4 leaves a remainder 2; and -1 is added if the value divided by 4 leaves a remainder 3.

The mapping and indexing described above make the decryption/cryptanalysis of a code depend on the contents/ values of the decrypted/cryptanalized result of the code itself. Such a way of introducing (fuzzy) residues is the application of Reflexive Dependency. During decryption, when the designated element is 'exposed', its value will become known and will be used as index into F or in other designed methods to find the multiple of a corresponding fuzzy residue applied. Then with the fuzzy residue identified and removed, the decoding/decryption to obtain the rest bits of the message unit can proceed.

Mapping can be numerous. The value of bits corresponding to a single key element can be individually mapped to a certain multiple of a fuzzy residue. The sum of the values of bits corresponding to more than one or even all the elements of a key section can also be used to map to some multiple of a fuzzy residue. Even a single element can be designated more than one fuzzy residue with different multiple mapping for the residues. In implementation, for example, a certain residue x that has been mapped by some element of one of the previously generated and iterated sections can also be mapped to by an element z of the key section currently being generated. In particular, if y is some number, then y-x can be a second residue for the currently generated key element where, if the mapping from z to x and y-x are the same, the residue is effectively just y. The values for fuzzy residues can take a wide range. Special mapping can be communicated first, possibly in shielded mode, before encryption starts. In applications, a key may be used for multiple messages without losing the message specific capability by making the residue mapping message specific. That is, even with the same key set and the same fuzzy residue set, each message can adopt a different fuzzy residue mapping, that is possibly communicated first in shielded mode, for the instance of secure communication.

Residues can be designed to disturb any inherited regularity of the public key set as well as to introduce fuzziness. As an example, it is assumed that the application adopts PPKS and let k=1 and c be some non-zero integer. A unique set (of identifiables) is generated and iterated twice to result in $A=\{a_1, a_2, \ldots, a_n\}$. Then a blurring set $B=\{b_1, b_2, \ldots, b_n\}$ is generated such that min(A)>max(B). To control the complexity of decryption, B can contain entries that are zeros and sum(B) can be limited to a number that is not too large. The public key vector is the permuted version of $(a_1+b_1*c, a_2+b_2*c, \ldots, a_n+b_1*c)$, which in effect is equivalent to A+B' for $B'=\{b_1*c, b_2*c, \ldots, b_n*c\}$. Encryption is still the simple inner product of the public key vector with the vector formed by bit groups. Decryption is more time consuming but parallel processing can speed up the calculations. As c and B are known, the 'fuzziness' or the possible number of c's a subset sum (code) can contain is also known. For each possible multiple m of c, m*c is first subtracted from the subset sum (code), then the difference will go through the normal inverse iterations and decryption process. The result of each trial can be one of the following:

1) successful decode (i.e. the difference can be expressed as a subset sum) and m=D×B where D is the vector of decoded bit groups 2) successful decode (i.e. the difference can be expressed as a subset sum) but m< >D×B where D is the vector of decoded bit groups 3) failed to get a decode (i.e. the difference can not be expressed as any subset sum)

In cases 2) and 3) it is known for sure that m, the number of c's subtracted, can not be right. Another valid multiple of c can be tried.

In case 1), there can be two implications. One case is that the correct decode is obtained; the other case is one of internal fuzziness. It is obvious that of all possible multiples of c tried, if case 1) appeared only once, then the decode obtained is the correct decode. However, if case 1) occurred more than once, it is definitely internal fuzziness. Internal fuzziness, however, can be quite efficiently removed, as to be seen in the protocols later introduced.

The concept of Rugged Compact Set is to leave 'cracks' in the range of values for the multiples of an element in a compact (knapsack) set subset sum. In other words, certain values of the bit groups will never be used in forming the subset sums. For example, given n=2 and h=5, an initial compact set can be {1, 32}. Let x be some small number that is either pre-defined and publicly known or communicated (possibly in shielded mode) at the start of the session. For the convenience of the explanation of this example, let x be 3 and randomly select 3 numbers from the inclusive ranges of [0, 31] and also another 3 from the range of [32, 1023] and make them 'cracks'. Then the radix, instead of $2^h$, will be $2^h-3$ and each number formed by the data bits in the new radix will map to the range of the old ($2^h$), 'skipping the cracks'. Assume also that the three 'cracks' in the range of [0, 31] are 5, 8 and 9, the mapping will be:

A message of a couple hundred bytes is relatively short, but taking it as a number, it is very large. One way of conversion is to map 'digit-by-digit'. It should be obvious that mapping 'digit-by-digit' will not cause a delay proportional to the length of the whole message as converting the number representing the whole message would. However, since the conversion is to take 'digits' of one base and to map it to that of another of a smaller base, there are situations where the 'digits' in the original, larger base is an 'overflow'. I.e. a digit of the large base may be larger than the largest of the small base. E.g. if base 10 numbers are to be mapped to base 8 numbers, a digit 8 in base 10 is larger than the largest, digit 7, in base 8. But there can be many ways of escaping or extending the numbers of the original base so that the conversion will work efficiently. The following is one of the many possible methods of efficient conversion.

In this example, numbers of base 256 are to be converted to base 253, and the number to be converted is assumed to be (3, 255, 252) of base 256. Here each digit of base 256 is represented by a number of base 10. For better comprehension, the number is represented in binary: 00000011 11111111 11111100. It is further assumed that it is made known to the encryptor that the 'cracks' are 5, 234 and 237. That is, for example, 6 will be mapped to 7, 235 will be mapped to 238, etc. Now 3 of base 256 is easily and directly mapped to 3 of base 253. 255 of base 256 is too large a 'digit' for base 253, it is made into 1111110011 by inserting two zeros, so that the binary bits becomes: 00000011111111100111 1111100. This way, the 'digit' (8-bit number) becomes 252, one that is representable in base 253. The next 'digit' (counting the inserted bits) or the next 8 bits are 11111111 in binary. Again as with the first 8-bit number, two zeros need to be inserted so that the original bits becomes 00000011111 1110011111 1001100. Since four bits are inserted, the last four bits in the bit sequence after insertions are not enough to form an 8-bit number. Therefore, 4 other random bits, say 0110 (6 in base 256), are appended to make it an 8-bit number. So the number in base 253 is (3, 252, 252, 198) or 00000011111111001111110011000110 in binary, which when mapped 'digit-by-digit' becomes: (3, 255, 255, 199) back in base 256. This number (3, 255, 255, 199) or bit sequence 00000011111111111111111111000111 will be encrypted. In

| New Radix: | 0 | 1 | ... | 5 | 6 | 7 | 8 | 9 | 10 | 11 | 12 | 13 | ... | 27 | 28 |
|---|---|---|---|---|---|---|---|---|---|---|---|---|---|---|---|
| | ↕ | ↕ | | ↕ | ↕ | ↕ | ↕ | ↕ | ↕ | ↕ | | ↕ | ↕ | | |
| Old Radix: | 0 | 1 | ... | 6 | 7 | 10 | 11 | 12 | 13 | 14 | 15 | 16 | ... | 30 | 31 |

The randomness of the 'cracks' can be again password driven. Encryption involves the conversion of the number represented by the bit group into the new radix and mapping the converted (new radix) number to the corresponding one of the old radix. The mapped corresponding number in the old radix is then used in the inner product operation. Decryption does the reverse and maps the decrypted number in the old radix back to that in the new radix.

To present a more detailed explanation of radix mapping for rugged compact set and to demonstrate the trivial matter of solving radix conversion overflow, the following example is presented.

It is very inefficient to actually convert the number representing the whole message from one base to another, because the message is almost always too big as a number.

actual application, other scrambling such as BFS may also be applied before Rugged Compact Set mapping.

After decryption, (3, 255, 255, 199) in base 256 will be obtained and mapped back from base 256 to base 253 and any 'digit' that has value of 252 gets the last two zero bits dropped from the binary representation. So in the bit pattern 00000011111111001111110011000111, the bits in bold face are removed, leaving 001111111111111111000111. The first 8-bit number is 3, the second 255 and the third 252. The four bits that can not form an 8-bit number are simply discarded. Therefore, the number converted back is (3, 255, 252), the original number, and in binary 000000111111111111111100, the original data bits. In fact, the bits inserted to avoid overflow need not be zero bits and random bits can serve the same purpose. When random bits are inserted, however, the last bits get dropped if the number equals or exceeds the maximum representation of the smaller base, e.g. 252 in the example given here.

In an alternate form, this invention can adopt more than one rugged mapping. E.g. given mapping $m_1, m_2, \ldots, m_n$, bit group i will use mapping $m_j$, where $j=(i\Xi n)+1$. In a further alternate form, $m_1, m_2, \ldots, m_n$ and their order can be standardized and a permutation of them may be used for a particular instance of encryption, where the specification of the permutation instead of the full specification of a set of mapping methods can be communicated for the encryption instance.

in the following, one type of delayed bit recovery is described. Given a (size-reduced) zero-one set $\{2, 3, 7\}$, assume that $m_1=13$, $w_1=11$ and $w^{-1}_1=6$ are selected. The resulting iterated set will be $\{9, 7, 12\}$, and m and 2*m are added to the set to form $\{9, 7, 12, 13, 26\}$. Then $m_2=71$, $w^{-1}_2=55$, and $w_2=31$ are selected. After the second iteration, the set will be $\{66, 4, 17, 48, 25\}$.

Let a bit group be 01010, and the inner product of the bit group by the set (both taken as vectors) will be:

0*66+1*4+0*17+1*48+0*25=4+48=52

To decrypt, 52 is first inverse iterated: $52*w_2^{-1}\Xi m_2 = 52*55\Xi71=20$ and $20* w^{-1}_1 \Xi m_1 = 20*6\Xi13=3$. As $m_1$ as and $2*m_1$ are integral multiples of $m_1$, the information of the last (rightmost) two digits of 01010 are 'submerged' in the inverse iteration by $m_1$ and $w^{-1}_1$. The recovery of these two bits may not be carried out right away but needs to be delayed. From the result 3 after the second iteration and the original decryption unique set $\{2, 3, 7\}$, the recovery of 010 is immediate. The intermediate result 20 obtained can help to recover the rest two bits. As the result (20) of the inverse iteration by $w^{-1}_2 \cdot m_2$ is just an inner product of (0, 1, 0, y, z) and (9, 7, 12, 13, 26), 13y+26z=20-(0*9+1.1*7+0*12)=13. From the second section $\{13, 26\}$, the last two bits can be easily recovered as 10. Therefore, the original bits 01010 are recovered.

Low density and data expansion resulted from encryption can be a big problem with knapsack type cryptosystems, and there have been proposed ways to limit them. Here is introduced another way of minimizing the expansion. First, it should have been observed that the way of delayed bit recovery just described is in itself a method of slowing down the expansion. After the first iteration, the sum of the set is 9+7+12=28, But a number (13) less than half the value of the set sum (28) can be used for deriving the element of the next section of the key set. (Note, the set is constructed in two sections). The second method is to use complementation of numbers with regards to the moduli. Using the complements still preserves the uniqueness of the sets. Here is an example:

Given the set $\{2, 3, 7\}$ as the first section, and parameters $m_1=13$, $w_1=11$ and $w^{-1}_1=6$ for the first iteration as before. After the first iteration, $\{2, 3, 7\}$ becomes $\{9, 7, 12\}$. Now, for any number in the set that is larger (smaller) than half the positive (negative) value of the modulus $m_1$, the modulus is subtracted from (added to) it. Since in the case presented here, they are all larger than half of $m_1=13$, $\{9-13, 7-13, 12-13\}=\{-4, -6, -1\}$. As before 13 and 26 are added to the set as new elements: $\{-4, -6, -1, 13, 26\}$. Now the modulus is selected to be greater than the sum of the absolute values of the numbers in the set (i.e. 4+6+1+13+26=50). Suppose that $m_2=53$, $w_2=27$ and $w^{-1}_2=2$ are selected, and after the second iteration and applying the same technique that guarantees the absolute values of all numbers in the set to be smaller than half the value of the modulus $(m_2)$, the resulting set is: $\{-2, -3, 26, -20, 13\}$.

Decryption is almost the same as that of the previous example of delayed bit recovery, but sometimes the number (code) needs to be 'complemented back' in the decoding process. In each of the iterations during the construction of the public key set, the largest possible positive sum and the smallest possible negative sum, which are called extremes, need to be recorded. For $\{-4, -6, -1, 13, 26\}$ the largest positive sum possible is 39 and the smallest negative sum possible is -11. If the set contains only positive (negative) numbers, then the smallest 'negative' (largest 'positive') number is defined to be zero. Complementing back takes place when the inverse iterated code is either larger or smaller than both extremes.

Using the same bit group 01010 as for the previous example, the resulting subset sum will be -23. After inverse iteration by $m_2=53$ and $w^{-1}_2=2$, the code becomes -46. Since -46 is smaller than the extremes -11 and 39 (for the set at that stage), it needs to be complemented by adding $m_2=53$ to it, resulting in 7. Then applying the next inverse iteration, $7*6\Xi13=3$ is obtained. Since at this stage, the corresponding original section $\{2, 3, 7\}$ only contains positive numbers, by definition, no complementation is required and the decryption of 3 to 010 for the first three bits is straightforward. Using the same bit recovery method, 7-(-6)=13, and the delay-recovered bits will be 10. Therefore the original bits 01010 are fully recovered. (If the number after inverse iteration is larger than the extremes, the modulus will be subtracted from the number, resulting in a negative number).

In fact, the first element of any private key set section can be κ, the smallest of:

1) $\eta > -\max(\eta_x*x)$ if after complementation all key and residue elements are negative and -κ does not equal any subset sum of the union of previously generated and iterated sections
2) $\kappa < -\max(\eta_x*x)$ if after complementation all key and residue elements are positive and -η does not equal any subset sum of the union of previously generated and iterated sections
3) $\kappa > \mathrm{sum}(\eta_x*|x|)$ otherwise where x is any element of either the decryption key set or the decryption fuzzy residue set so far generated and iterated, and $\eta_x$ is the maximum applicable multiple of x. Let y be the element of the encryption key set or of the encryption fuzzy residue set to which x will be transformed, maximum applicable multiple is the largest multiple of y that may be applied in encryption. In the above example of complementation, based on the specification of κ, 8 instead of 13 can be an identifiable as the first element of the second section if the second section is not submerged.

Identification and authentication methods are described in the following two protocols.

Let the communicating parties be Party X and Party Y.

Let Party X be the initiator of the identification process.

Let $K_{Yip}$ be the public identification key of Party Y not used for any other purpose.

Let $K_{Yis}$ be the private identification key of Party Y not used for any other purpose.

A challenge can be some random bit sequence generated by the party initiating the identification process and sent to the party to be identified, or it can be some request for certain proprietary information, such as a password or hashed session identifiers, which only the communicating parties alone share, or it can be a combination of the above two. For the convenience of the explanation of the protocol, $C_x$ is assumed to be some random bit sequence generated by Party X for the purpose of identifying Party Y.

Let $I_x$ be (the enumeration of) some particular publicly known computation on the challenge $C_x$, such as a one-way function. For the convenience of the explanation of the protocol, $I_x$ is assumed to be the set of indices of a subsequence of $C_x$, i.e. $I_x=\{i: c'_i \epsilon C'_x \text{ is a bit}\}$ where $C'_x \subseteq C_x$.

Let <claim>$_x$ be an indication claiming the sender as Party X.

Let <request>$_x$ be a request from Party X asking Party Y to identify itself.

Let →(→) indicates transmission from Party Y to Party X (Party X to Party Y).

Let t be some maximum time (e.g. microseconds) within which a response from the other party being challenged is expected. t is required, for this simplified protocol being described, to be much smaller than the fastest known cryptanalysis to break the encrypted challenge.

Let K(x) shorthandedly denote the encryption/decryption of x using K as the key.

Assume that Party Y agrees to <request>$_x$.

| Party X | Party Y |
|---|---|
| Dial up | |
| | Pick up and establish connection |
| <claim>$_X$ → | |
| <request>$_X$ → | |
| $K_{YIp}(C_X \cdot I_X)$ → | |
| | Receive <claim>$_X$ |
| | Receive <request>$_X$ |
| | Wait |
| | IF t expires before receiving $K_{YIp}(C_X \cdot I_X)$ |
| |   Record protocol failure |
| |   Abort the protocol or take other actions |
| | Receive $K_{YIp}(C_X \cdot I_X)$ |
| | Decrypt to get $C_X \cdot I_X = K_{YIs}(K_{YIp}(C_X \cdot I_X))$ |
| | Extract (compute $C_X$" from $C_X$ based on $I_X$ |
| | ← $C_X$" |
| Wait | |
| If t expired before receiving $C_X$" from Party Y | |
|   Record that Party Y failed to identify itself | |
|   Abort the protocol or take other actions | |
| Receive $C_X$" | |
| If $C'_X <> C_X$" | |
|   Record that Party Y failed to identify itself | |
|   Abort the protocol or take other actions | |
| Protocol complete and Party Y identified | |

In the case of mutually identifying the communicating parties, each party will try to identify the other in the same way. This protocol depicts the basic idea of identification/authentication.

As identification is done in a time constraining fashion using time out, the identification keys need not introduce unremovable fuzziness.

The protocol just described, as well as other protocols introduced in this invention, is in its simplest form and it should be obvious to one skilled in the art that in order to foil resend and replay attack, whatever is encrypted and sent by one party should not be sent again, in whole or in part, by the other party in its original form. It should be made intractable, such as being hashed by a one-way hash function. So $C_x$", a portion of $C_x$, in the above protocol should be hashed by a one-way hash function H before being sent back to Party X, and comparison will be made on $H(C'_x)$ and $H(C_x")$ instead of $C'_x$ and $C_x$". It is especially important to be aware that the simple description given shows only a basic element of a practical identification protocol and that it should be obvious to one skilled in the art to realize that the weakness of such an isolated element can be exploited to commit the Mafia Fraud. As a matter of practicality and except in special application cases, the party initiating the communication must also be challenged and challenged first.

In the following protocol, identification and the establishment of shielded mode is demonstrated as an integrate procedure, an inseparable primitive, where identification is performed with the intrinsic exchange of public shield keys.

Let Party X be the initiator of the identification and shielded mode establishment process.

Let $K_{xIp}$ be the public identification key of Party X not used for any other purpose.

Let $K_{yIp}$ be the public identification key of Party Y not used for any other purpose.

Let $K_{xIs}$ be the private identification key of Party X not used for any other purpose.

Let $K_{yIs}$ be the private identification key of Party Y not used for any other purpose.

Let $K_{Xp}$ be the public shield key for Party X, which is dynamically generated for each communication instance.

Let $K_{Yp}$ be the public shield key for Party Y, which is dynamically generated for each communication instance.

Let $K_{Xs}$ be the private shield key for Party X, which is dynamically generated for each communication instance.

Let $K_{Ys}$ be the private shield key for Party Y, which is dynamically generated for each communication instance.

The identification keys and the shield keys do not introduce unremovable fuzziness.

Let <claim>$_x$ be an indication claiming the sender as Party X.

Let <request>$_x$ be a request from Party X asking Party Y for secure communication.

Assume that Party Y agrees to <request>$_x$.

A challenge can be some random bit sequence generated by the party initiating the identification and sent to the party to be identified, or it can be some request for certain proprietary information, such as a password or hashed session identifiers, which only the communicating parties alone share, or it can be a combination of the above two. For the convenience of the explanation of the protocol, $C_x$ ($C_y$) is assumed to be some random bit sequence generated by Party X (Party Y) for the purpose of identifying Party Y (Party X).

Let $I_x$ ($I_y$) be (the enumeration of) some particular publicly known computation, such as a one-way function. For the convenience of the explanation of the protocol, $I_x$ ($I_y$) is assumed to be the set of indices of a subsequence of $C_x$ ($C_y$), i.e. $I_x=\{i: r_i \epsilon R_y \text{ is a bit}\}$ where $R_y \subseteq C_x$ (or $I_y=\{i: r_i \epsilon R_x \text{ is a bit}\}$ where $R_x \subseteq C_y$).

Let ←(→) indicates transmission from Party Y to Party X (Party X to Party Y).

Let t be some maximum time (e.g. expressed in microseconds) within which a response from the other party being challenged is expected. t is required, for this example, to be much smaller than the fastest known cryptanalysis to break the encrypted challenge.

Let K(x) shorthandedly denote the encryption/decryption of x using K as the key.

Let H be a one-way characteristics function.

| Party X | Party Y |
|---|---|
| Dial up | |
| | Pick up and establish connection |
| <claim>$_X$ → | |
| <request>$_X$ → | |
| $K_{YIp}(K_{Xp})$ → | |
| | Receive <claim>$_X$ |
| | Receive <request>$_X$ |
| | Wait |
| | IF t expires before receiving $K_{YIp}(K_{Xp})$ |
| |   Record protocol failure |
| |   Abort the protocol or take other actions |
| | Receive $K_{YIp}(K_{Xp})$ |
| | Decrypt to get $K^1{}_{Xp} = K_{YIs}(K_{YIp}(K_{Xp}))$ |
| | ($K^1{}_{Xp}$ is the public shield key of Party X) |
| | ← $K^1Xp(K_{XIp}(\beta \cdot K_{Yp} \cdot C_Y \cdot I_Y))$ |
| |   where $\beta = H(K^1{}_{Xp} \cdot I_Y \cdot C_Y)$ |
| | (Notice: The initiating party is challenged first) |
| Wait | |
| If t expired before receiving $K^1{}_{Xp}(K_{XIp}(\beta \cdot K_{Yp} \cdot C_Y \cdot I_Y))$ | |
|   Record that Party Y failed to identify itself | |
|   Abort the protocol or take other actions | |
| Receive $K^1Xp(K_{XIp}(\beta \cdot K_{Yp} \cdot C_Y \cdot I_Y))$ | |
| Decrypt to get $\beta' \cdot K^1{}_{Yp} \cdot C^1{}_Y \cdot I^1Y = K_{XIs}(K_{Xs}(K^1{}_{Xp}(K_{XIp}(\beta \cdot K_{Yp} \cdot C_Y \cdot I_Y))))$ | |
| ($K^1Yp$ is the public shield key of Party Y) | |
| if $B' <> H(K_{Xp} \cdot I^1Y \cdot C^1{}_Y)$ | |
|   Record that Party Y failed to identify itself | |
|   Abort the protocol or take other actions | |
| (Party X's public shield key $K_{Xp}$ is established at Party Y) | |
| Compute $R_x$ from $C^1{}_Y$ based on $I^1Y$ | |
| $K^1{}_{Yp}(K_{YIp}(\gamma \cdot R_X \cdot C_X \cdot I_X))$ → | |
|   where $\gamma = H(K^1{}_{Yp} \cdot I_Y \cdot C_Y)$ | |
| | Wait |
| | If t expired before getting $K^1{}_{Yp}(K^{YIp}(\gamma \cdot R_X \cdot C_X \cdot I_X))$ |
| |   Record that Party X failed to identify itself |
| |   Abort the protocol or take other actions |
| | Receive $K^1Yp(\gamma \cdot R_X \cdot C_X \cdot I_X)$ |
| | Decrypt to get $\gamma' \cdot R^1{}_X \cdot C^1{}_X \cdot I^1{}_X = K_{YIs}(K_{Ys}(K^1{}_{YIp}(\gamma \cdot R_X \cdot C_X \cdot I_x))))$ |
| | If $R_X <> R^1{}_Y$ or $\gamma' <> H(K_{Yp} \cdot I^1{}_X \cdot C^1{}_x)))$ |
| |   Record that Party X failed to identify itself |
| |   Abort the protocol or take other actions |
| | (Party X identified) |
| | (Y's public shield key $K_{Yp}$ established at X) |
| | Compute $R_Y$ from $C^1{}_X$ based on $I^1{}_X$ |
| | ← $K^1{}_{Xp}(K_{XIp}(R_Y))$ |
| | (Protocol complete if $R_Y$ is the replay Party X expects) |
| Wait | |
| If t expired before receiving $K^1{}_{Xp}(K_{XIp}(R_Y))$ from Party Y | |
|   Record that Party Y failed to identify itself | |
|   Abort the protocol or take other actions | |
| Receive $K^1{}_{Xp}(K_{XIp}(R_Y))$ | |
| Decrypt to get $R^1{}_Y = K^1Xp(K_{XIp}(R^Y))$ | |
| If $R_Y <> R^1Y$ | |
|   Record that Party Y failed to identify itself | |
|   Abort the protocol or take other actions | |
| (Party Y identified) | |
| (Protocol complete) | |

For higher security, especially to foil man-in-the-middle type of attacks, the previously described protocol can take an alternate form where the bits of at least one time sensitive transmission block of each communicating party can be re-grouped into n>2 portions, $p_1, p_2, \ldots, p_n$, by standardized or agreed upon methods and sent after a pause of $\alpha$ satisfying:

It is computationally infeasible to use the same scrambling methods to construct the first k bits of the time sensitive transmission block with only $p_1, p_2, \ldots, p_{n-1}$ available, and $\alpha*n+d \geq t$ and $\alpha*(n-1)+d<t$, where k is the size of $p_1$ in bits and d is larger than or equal to the maximum expected delay for the transmission over the media. The receiving party expects to get $p_1$ before t expires and k is sufficiently large (recommended to be at least 128).

and the portions are reassembled back to the original time sensitive transmission block at the receiving party. A public-key block cipher is a good and natural choice for such a scheme with well-chosen values for $\alpha$ and d. It should be obvious to one skilled in the art that portions mentioned here are not limited to consecutive bits in a block. In fact, for higher security, a portion should be bits selected over the whole block.

In all the subsequent protocols introduced and examples given, it is implied that necessary and proper identification process is always carried out and that necessary and proper shielded mode established. Therefore, if some bits are said to have been transmitted, they can be in reality transmitted after being encrypted by the proper shield encryption key.

The protocol for QPKS is demonstrated next in a slightly simplified fashion.

It is assumed that each extended set is a zero-one set containing exactly one message unit, and for simplicity it is also assumed that no unremovable fuzziness exists. (In the case where there is unremovable fuzziness, some fuzziness resolution method can be invoked inside this protocol to remove the fuzziness). In addition, it is also assumed that n is a power of 2.

To single out the actual key/data element (which is a tangible) from an extended set, a protocol similar to the following can be employed:

1. For each extended set $S_i$, the receiver of the extended sets uses three other sets $A_i$, $B_i$ and $C_i$. $A_i$ will contain the eliminated elements that are not the true key/data element, and $B_i$ and $C_i$ each contains half of the elements not in $A_i$. The elements not in $A_i$ contain the only real key/data element. At the start, $A_{i\,1}$, $B_i$ and $C_i$ are all empty.

2. Let $m<n \div 2$ 3. ($2*m$ is the number of elements now in $S_i$ where one of the element is the true key/data element and Si is reduced by half each time). For each extended set $S_i$ that has more than one element in it, the receiver randomly moves m elements from $S_i$ to $B_i$, and makes copies of the remaining elements in $S_i$ and put them in $C_i$.

4. For each set $S_i$ that contains more than one element, move $n \div 2 - m$ elements, by random selection, from $A_i$ to $S_i$. If $A_i$ is empty, nothing happens.

5. For each set $S_i$, sum the elements in $S_i$ to get $s_i$. If $S_i$ contains a single element, $s_i$ is set to 0.

6. Send the sums $s_1, s_2, \ldots$ to the sender of the extended sets.

7. The sender of the extended sets decodes and sends bits $b_1, b_2, \ldots$ back to the sender. $b_i$ is set to 1 if $s_i$ contains the real key/data element, and to 0 otherwise.

8. The receiver of the extended sets on receiving $b_1, b_2, \ldots$, based on the value $b_i$, does the following:

if $b_i = 1$ then
  $A_i < B_i \cup A_i$  (newly identified non-key/data elements moved to $A_i$)
  $B_i < \emptyset$
  $S_i < C_i$
  $C_i < \emptyset$
if $b_i = 0$ then
  $A_i < C_i \cup A_i$  (newly identified non-key/data elements moved to $A_i$)

-continued

```
    C_i < Ø
    S_i < B_i
    B_i < Ø
end if
```

9. If all $S_i$'s only have one element left in them, go to step 12.
10. Let m<m÷2.
11. Go back to step 3.
12. The only one element left in each of the $S_i$'s is the key/data element (with the inserted leading one-bit), and it takes a maximum of $\log_2(n)$ repeats to extract it.

Fuzzy residues can also be applied to QPKS as in PPKS. In steps2 and 10, instead of taking exactly half of the elements, approximately half of them or even any sufficiently large number of them can be chosen to form the subset sum and n will be no longer required to be a power of 2. The number of repeats will then be more than that given in 12. Under the condition that the probability τ of a random number (smaller than the largest possible code value) being a valid code (subset sum) is small and the extended set is one of identifiables, the protocol may also be extended in another embodiment where, in Step 5 when the encryptor (receiver of the extended sets) has already identified the key/data element, i.e. $S_i$ contains a single element, a random number can be sent instead of zero as specified in Step 7. The decryptor (sender of the extended sets) meanwhile has a high probability of detecting an invalid code thus realizing the corresponding key/data element has been identified. In such a case, the decryptor can randomly respond with $b_i$ equaling either a 0 or 1 thereafter for any $s_i$ received, and for the encryptor, the response $b_i$ corresponding to the si sent is always ignored. Furthermore, a scheme can be designed so that invalid codes may also be sent in any round of the identification process and, if τ is very small, feedback mode may also be applied where the system or the encrypting and decrypting parties may decide whether or not to apply the value of the invalid codes in feedback. Since τ is very small, the chance for the protocol to fail due to multiple non-unique subset sum solutions will be very rare. It should be obvious to one skilled in the art that additional verification, similar to the fuzziness resolution protocol introduced later in this invention, can be performed to guard against even the slightest chance of a failure.

In still another embodiment, the extended sets of QPKS with identifiables instead of tangibles can be used as the actual encryption key after the identifiables in them are identified. The encrpyptor uses the identifiables to correspond to data bit groups and generates random bits to correspond to other elements in the extended sets in producing subset sums (codes).

In the following, methods and protocols are introduced to limit the complexity growth of decryption due to fuzziness and to resolve the fuzziness.

The methods and protocols will be demonstrated for both removable and unremovable fuzziness. They will be considered in two separate cases, first in a special case, then in a generalized case.

In designing the cryptosystem and in constructing the keys, the 'amount' of fuzziness can be controlled. However, more data will produce more codes and, as a result, more likely the cryptosystem may encounter a code that can be decoded in more than one way. The following illustrates the implications and the methods dealing with non-unique decodes.

Removable Fuzziness: It is assumed that the ciphertext has n codes $c_1, c_2, \ldots, c_n$. When correctly decoded, $c_i$ will be decoded to $d_i$ for $1 \leq i \leq n$ and i< >2 and i< >9. $c_2$ can be decoded into $d_{21}$ and $d_{22}$, and $c_9$ can be decoded into $d_{91}, d_{92}$ and $d_{93}$. Of these multiple, non-unique decodes, only $d_{22}$ and $d_{91}$ are the correct ones. It is further assumed that feedback mode is not applied for the encryption. Therefore, the codes will be (possibly independently) decoded to the following:

$d_1, d_{21}, \ldots, d_8, d_{91}, d_{10}, \ldots, d_n$ $d_1, d_{22}, \ldots, d_8, d_{91}, d_{10}, \ldots, d_n$ $d_1, d_{21}, \ldots, d_8, d_{92}, d_{10}, \ldots, d_n$ $d_1, d_{22}, \ldots, d_8, d_{92}, d_{10}, \ldots, d_n$ $d_1, d_{21}, \ldots, d_8, d_{93}, d_{10}, \ldots, d_n$ $d_1, d_{22}, \ldots, d_8, d_{93}, d_{10}, \ldots, d_n$ Of all these set of decodes only $d_1, d_{22}, \ldots, d_8, d_{91}, d_{10}, \ldots, d_n$ is the correct one. Each of the possible set of decodes is referred to as a combination. Since the fuzziness is removable, there is a way to recognize and to eliminate the incorrect combinations and/or identify the correct combination, the correct decode $d_1, d_{22}, \ldots, d_8, d_{91}, 1$ $d_{10}, \ldots, d_n$ can be obtained.

Unremovable Fuzziness: If in the above case, fuzziness is not removable, some kind of resolution is needed to identify the correct decode combination. One way of resolving the unremovable fuzziness is the following resolution protocol and method:

The decryptor generates some random bit sequence s and sends it to the encryptor. The encryptor 'blends' s with the original data bits in some predefined fashion or in some way communicated (possibly in shielde mode). For example, bits are taken one by one alternately from s and the original data bits. When one (either the original data bits or s) is exhausted before the other, the remaining bits of the other are simply appended at the end. Then some pre-determined or communicated one-way characteristics function or one-way compress hash function is applied to the blended new bit block and the result h of the hash is sent back to the decryptor. Meanwhile, the decryptor blends the bits of each combination with s the same way as the encryptor and applies the same hash function to the blended bit block to obtain the hash value h'. It then compares h and h'. If they are identical, the corresponding combination of h' is a candidate for the correct decodes, otherwise it discards the combination as invalid. After all combinations are processed in this way, if there is only one whose hash value is identical to that sent back from the encryptor, then that combination is the correct one. In some cases, likely very rare if the hash is collision sparse, more than one combination can be thus hashed to the same value. If all invalid combinations need to be eliminated, another new random bit sequence will be generated, with possibly a different function agreed upon, and the protocol repeated till the correct combination is identified.

If feedback mode is applied in encryption for both removable and unremovable cases, the situation is just slightly more complicated in appearance. It can be observed that one of the combinations, the correct one, will remain the same, while others are likely to be different from those listed in the removable fuzziness case. The reason is that the feedback mode need to be inverted in order to get the correct decodes.

However, if a wrong decode that satisfies as a subset sum is used in the descrambling (the inverse of applying feedback mode), the next code will be in the wrong bit pattern. Subsequently its decode and the decodes of the rest of the codes will be wrong. But such situations can be handled properly using techniques such as fuzziness resolution protocols. Besides, if a code is descrambled wrong, it can become a number that can not be constructed from the public key. So the invalidity of a combination can be detected without the need for the help of the resolution protocol.

The previous two cases only dealt with the special situation in which fuzziness is not much and the combinations are a limited few. When codes that can be decoded non-uniquely are many, combinations can be many and the number of combinations can grow out of bound. However, with the resolution protocol, the fuzziness or the number of combinations can be trimmed at any time. Instead of requesting the encryptor to do a hash on the entire message, the decryptor can, at any time during the decryption process for instance, elect any and any number of the original data bits for the encryptor to calculate the hash value on. A threshold value can be set. If the number of combinations exceeds the threshold, the resolution protocol is triggered and the decryptor can send a random bit sequence to the encryptor and request the encryptor to blend the bit sequence with the ith through the jth bits, for example, in the original data and report the hash value of the blended result. The way to blend can be pre-defined or communicated for the current secure session.

The random bit sequence can be 'empty', meaning that the hash will be done solely on the original data bits by the encryptor, and solely on the bits in the combinations by the decryptor. The hash function can be one from a pre-defined set communicated for the instance of encryption. All communications can as normal be in shielded mode.

One way of designing removable fuzziness is to use special rules that have to be observed in conjunction with the subset sum satisfiability. A concrete example of removable fuzziness case is one in which the data to be encrypted are English text that is first bi-directionally scrambled. After obtaining the combinations, the decryptor performs bi-directional descrambling and checks if the result satisfies English syntax, grammar, etc. If feedback mode is used, the invalid decodes and the wrongly descrambled results (due to inverting the feedback operation) can rarely produce valid, meaningful English text. Therefore, decryption is little affected by the use of feedback. By the same token, in the unremovable fuzziness case, decryption is not much affected either, since it is very unlikely that more than one combination can satisfy the special rules.

An example of unremovable fuzziness is some cryptographic key being encrypted and sent. As such a key can be syntax and semantics dense, fuzziness can not be removed as in the English text example. However, by calculating a characteristics value or a compress hash value and appending it at the end of the original data block, the unremovable case can be largely reduced to a removable case, where the decryptor calculates, after decoding, the hash value of each combination and checks against this appended hash value to identify the correct combination. If feedback mode is used, the scrambling by feedback can extend over all original message units and the appended hash value as well. Therefore, the wrong combination will most likely contain the wrong hash value. Furthermore, it is still very unlikely that the wrong hash value will equal the hash value of a wrong combination. In the rare case where more than one combination can be hashed to a value equaling the decoded hash value, the resolution protocol can be invoked to handle the situation. It should be obvious to anyone skilled in the art that the appended hash talked about here, as well as elsewhere in this invention, can be in a generalized sense where, for example, the true hash value consists of a series of:

$$H_1(P_1(T)), H_2(P_2(T)), \ldots$$

for a message T, some one-way hash functions $H_i$, and permutation or scrambling functions $P_i$ where $i=1, 2, \ldots$ For higher security, the resolution protocol invocation during the process of decryption should be minimized and the hash function should return values that are likely to eliminate only a part of the invalid combinations, but not all of them, e.g. a collision-ridden one-way hash. Only the last invocation should use a hash function that tends to remove as many remaining invalid combinations as possible, e.g. a collision sparse one-way hash. One simple and effective hash function for partial elimination of invalid combinations is a remainder function. For example, if the modulus is 5, then about four fifths of the incorrect combinations on average will be eliminated.

Another method in this invention is to reduce the reliance on a single trusted third party for signature verification. The verification can involve many register-converter pairs so that problem with verification can be detected even when one or a limited few register-converter pairs are compromised. Through secure communications, a signer first registers its signature conversion key with several register-converter pairs which observe the policy not to share the information about the signer's public identity or its signature conversion key. The publicly known identity of a signer may include its name, address, public identification key, etc. The register keeps the identity of the signer but not its signature conversion key; the converter keeps the signature conversion key of the signer but not the association of the key with the signer. In other words, the converter has the signature conversion key but has no knowledge to whom the signature conversion key belongs. The register and the converter refer to the signature conversion key and identity of the signer via a unique identifier I. In the registering process, the signer identifies itself to the register and receives from the register a registration session identifier which the signer uses to identify itself to the converter when supplying the converter with the signature conversion key. The register after identifying the signer, generates I and the registration session identifier; sends them both to the converter and sends the registration session identifier to the signer. The register also stores securely the public identity of the signer and I as associated items. The signer then communicates with the converter the register paired with, identifying itself by the registration session identifier and provides the signature conversion key. The converter verifies that the signature conversion key is valid and notifies both the signer and the register that the signature conversion key is accepted. The converter then securely stores the signature conversion key and I as associated items. To verify a signature of the signer, a signer securely contacts one or more register-converter pairs with which the signer has registered its signature conversion key. The signee identifies itself to each of the registers, sends the signature and the public identity of the signer. The register looks up I by the public identity of the signer, generates a verification session identifier J, and sends securely to the converter the signature, I, and J. The converter looks up the signature conversion key via I received from the register, processes the signature into T using the retrieved signature conversion key, and sends the register J and T. The register then sends T to the signer. The signer verifies the signature by consulting T with respect to the document T represents and accepts the signature as valid if the verification is successful. The consultation varies depending on each individual signature key/scheme. In some cases, T will be identical to the binary representation of the document before being digitally signed and a direct comparison may verify the validity of the signature, while in others T is an unforgeable representation of the document and has to satisfy some criteria, to have certain characteristics, or to be within certain ranges. The converter may log securely the signature, I, J, T, and a timestamp as associated items for history reference, and the register may log securely the signature, I, J, T, a timestamp, as well as the identity of the signer as associated items for history reference. They may also publish the timestamp, J, T and/or the signature, where the published T and/or signature is required to be neither the original document nor something that may reveal any part of the contents of the document.

Henry's double-encryption method (see U.S. Pat. No. 4,399,323) can be employed in another embodiment of this invention with a trade-off of storage for speed in cases where multiplication has to be costly simulated.

In still another embodiment of this invention, the Chinese Remainder theorem can be applied to reduce the key and fuzzy residue sets to residue classes, where a set $K=\{k_1, k_2, \ldots, k_n\}$ is reduced to $K_i=\{k_{i,1}, k_{i,2}, \ldots, k_{i,n}\}=\{k_1 \Xi m_i, k_2 \Xi m_i, \ldots, k_n \Xi m_i\}$ for $1 \leq i \leq q$, where $M=m_1 * m_2 * \ldots * m_q$, $M > \text{sum}(K)$ and the $m_i$'s are pairwise relatively prime. At least one of the $m_i$'s is published and at least one of the $m_i$'s that is sufficiently large (e.g. at least $2^{80}$) is kept secret.

EXAMPLES

In order to better illustrate the basic concepts of this invention, some examples are given here with the following assumptions:

1. The general definition of the cryptosystem by this invention is adopted: $S=\{C, h, I, k, n, P, R, R\}$
2. $n=8$
3. $C=\{0, 1, \ldots, 1, 0\}$ (all but the first and last sections are to be wrinkled with $c_i=1$ for $1<i<k$).
4. $h=2$
5. $B=B_1 \cup B_2 \cup \ldots \cup B_k$ is the wrinkling set where $B_i$ corresponds to the ith section of the keys.

```
If c_i=0, then B_i=0={0, 0, ...} (i.e. all elements of B_i are zeros)
If c_i<>0, then b_{i,1}=0
    if c_x=0 for all x<i
        b_{i,2}=1
    else
        b_{i,2}=2*max(B_1 ∪ B_2 ∪ ... ∪ B_{i-1})
    b_{i,j}=2*b_{i,j-1} for 3≤j
```

6. $a_{1,1,} > (2^h-1)*\text{sum}(B)$
7. $t_i=1$, for $1 \leq i \leq k-2$, $t_{k-1}=0$ and $t_k=2$
8. The password is 123 in ASCII (3 bytes)
9. The operational password length (the minimum length that the cryptosystem requires to operate) is 12 bytes.
10. The restrictions on password are relaxed so that 123 is accepted with password expansion: the shorter password is repeatedly concatenated by itself till its length reaches 12 bytes.
11. The random number generator (abbreviatedly referred to as generator) and the (re)initializer of the generator are rand( ) and srand( ) respectively of the C programming language.
12. Section sizes are within the range of [2, 3], except possibly for the last section which may be smaller.
13. The random factor for generating elements of the key sets is a number within the inclusive range of [1, 8]. E.g. $a_{1,1}=(2^h-1)*\text{sum}(B)+(\text{rand}(\ )\Xi 8)+1$.
14. The random factor for generating the ith (actually generated) modulus is $2^{i-1}*128$.
15. The seeds to re-initialize the generator are numbers in binary representation and each seed is comprised of two consecutive bytes of the expanded password.
16. The inclusive range for generating the re-initialization points is [2, 3].
17. The third section is designated to map to a fuzzy residue. I.e. the sum of the bit group values corresponding to the elements of the third section will be mapped to a fuzzy residue.
18. Fuzzy residue mapping for the third section by a function $SM_3$ is:

| sum of bit group values: | 0 | 1 | 2 | 3 | 4 | 5 | 6 |
|---|---|---|---|---|---|---|---|
| | ↕ | ↕ | ↕ | ↕ | ↕ | ↕ | ↕ |
| fuzzy residue multiple: | 0 | 3 | 4 | 5 | 6 | 8 | 9 |

19. The last element of the last section is designated to map to a fuzzy residue by a function $IM_4$ in the following way:

| bit group value: | 0 | 1 | 2 | 3 |
|---|---|---|---|---|
| | ↕ | ↕ | ↕ | ↕ |
| fuzzy residue multiple: | 0 | 2 | 3 | 5 |

20. The fuzzy residue for the third section is in the inclusive range of [1, 1000] and is the first element in the fuzzy residue set.
21. The fuzzy reside for the last element of the last section will be smaller than the last element of the last section, but at least two thirds of the last element of the last section. It is the second element in the fuzzy residue set.
22. The two fuzzy residues will be published, and the mapping of assumptions 18 and 19 made known to the encryptor.

This invention needs random numbers for system parameters such as key set elements, the numbers used in iterations, etc. To guarantee that the cryptosystem always has enough such numbers, and to facilitate the password to key mapping, this invention uses a method to generate pseudo-random sequences to augment the limited (random) input. Next password expansion and password to key mapping are demonstrated with some examples.

As the password is shorter (by assumptions 8 and 9) than the operational password length, it is repeatedly concatenated by itself:

```
123          • 123   =>  123123
123123       • 123   =>  123123123
123123123    • 123   =>  123123123123
```

So after concatenating itself 3 times, the expanded password becomes 123123123123 having 12 bytes, meeting the operational password length requirement. Therefore, the expanded password will be used as the actual input to the generator to generate keys and other parameters. Since the expansion is deterministic and unambiguous, a passwords of shorter length (than the operational password length) will invariably be expanded the same way into the same expanded password.

Many other ways can be used for password expansion, as long as they are deterministic and do not produce a one to many mapping from short passwords to their expanded versions. This example does not imply that expansion is just password concatenating itself. Furthermore, passwords may be processed/scrambled first before being used as seeds.

A ranged random number is obtained by applying the range operation on a random number:

$$r \text{ modulo (upperbound-lowerbound+1)+lowerbound}$$

where r is a randomly generated number.

As rand( ) by definition and specification returns a number between 0 and $2^{15}-1$, the numbers generated will all be ranged numbers. Therefore, ranged random numbers will simply referred to as random numbers.

As the numbers returned by rand( ) are limited in size, for larger numbers, they can be constructed from smaller numbers returned by rand( ). E.g. two numbers: 578 and 123 can be 'concatenated' to become 578123. Other simple and efficient methods of forming larger numbers can also be used.

The expanded password will be used 2 bytes at a time as seeds to initialize and reinitialize the random number generator. In this particular example, the six seeds will be: 12 31 23 12 31 23. The binary representation of each two-byte couple (in ASCII) will be used. E.g. the decimal value of 1 and 2 in ASCII are 49 and 50 respectively. In binary, the bit pattern will be 00110001 and 00110010. Therefore, the binary representation of ASCII 12 is 0011000100110010 which, 49*256+50=12594 in decimal, will be the first seed to be used to input into srand( ) to do the first initialization. The expanded password bytes need not be used verbatim. They can be further processed first, e.g. with the bits permuted, before being used for initialization of the random number generator.

For the example given here, 12594 is used in the call to srand( ) and with the range specified in assumption 16, a sequence will be generated via 6, not necessarily consecutive, calls to srand( ), corresponding to the six seeds: SEQ: $s_1, s_2, \ldots, s_6$ Then starting with the first number $s_1$ of SEQ as the currently used number, each random number is generated in the following way:

```
Let i=1
IF the number in SEQ that is currently used is zero (s_i=0) THEN
    IF currently used number in SEQ is not s_6 (i<6) THEN
        increment i by 1
        re-initialize the generator using the next seed s_i
    END IF
END IF
call rand(), applying the range if supplied (in this example [2,3])
    by assumption 12)
decrement currently used number (s_i) in SEQ by 1
```

The above description shows how the parameters in I, the (re-)initialization points can be generated. It also demonstrates the use of a random number generator to realize an expand hash function to generate sequences and to produce a close to random sequence by expanding limited random input. As every step in the process is deterministic, the same input will generate the same sequence which, when used to construct keys, will result in the same keys. Therefore, password to key mapping is simple, straightforward, effective and efficient.

There can be a great many ways of generating such sequences with input mapping. This example process is just to depict the basic concept.

In the example of PPKS given here, the dual concept of WPKM and RPKM is demonstrated.

First, the sizes of the sections are generated with the inclusive range of [2, 3] (by assumption 12). The first request for a random number will return 3. (In the examples, only the end result will be shown for each request for a random number). The second and third ranged random number will be 2 and 2. No fourth call will be made, as the range [2, 3] and the cryptosystem specification (n=sum({$z_1$, $z_2, \ldots, z_k$})) determine the size of the last section to be 1. I.e. n-3-2-2=8-7=1

Then the number of elements in wrinkling sets are calculated by the rule: section size minus one (assumption 15).

For the first and fourth sections, since $c_1=c_4=0$, they are not to be wrinkled.

For the second section, 1 (=2-1) element is to be wrinkled.

For the third section, 1 (=2-1) element is to be wrinkled.

By assumption 5, $B_2=\{0, 1\}$ and $B_3=\{0, 4\}$, and trivially $B_1=\{0, 0, 0\}$ and $B_4=\{0\}$.

Then the first element of the first section is calculated as: sum(B)*($2^h-1$)+Random(1, 8), where Random(1, 8) is the generator with range [1, 8] specified. The range [1, 8] used is based on assumption 13. The ranged number returned by Random( 1, 8) will be 6, therefore the first element of the first key section is:

$$\text{sum}(B)*(2^h-1)+\text{Random}(1, 8)=(1+4)*(2^2-1)+6=5*3+6=21.$$

The so far constructed private key set contains only this element: $A=\{a_{1,1}\}=\{21\}$ The next key element is calculated as: ((sum(B)+sum(A))*($2^h-1$)+Random(1, 8)=(5+21)*3+4=82, and the third element of the first section is calculated as: ((sum(B)+sum(A))*($2^h-1$)+Random(1, 8)=(5+21+82)*3+2=326. Now A={21, 82, 326}. A set D will also be used that contains the intermediate results of the public key set as it goes through iterations. Therefore at this stage, D={21, 82, 326}.

Now the first section, which should have three elements, is generated.

As $c_1=0$, no wrinkling will take place. As $t_1=1$ one iteration will be performed on the so far constructed D. The modulus is calculated as: $m_{1,1}$=((sum(B)+sum(D))*($2^h-1$)+Random(1, 128)=(5+429)*3+109=1411. The upper bound (128) of the range used is by assumption 14. A number that is relatively prime to the modulus is then generated, together with its multiplicative inverse: $w_{1,1}$=878 and $w^{-1}_{1,1}$=728. There are many ways to obtain a relatively prime number. One way is to 'randomly' find primes that are not factors of $m_{1,1}$, and the product of these primes will be relatively prime to $m_{1,1}$. The way this number is derived must be deterministic and could be driven by the password. B and D are then iterated:

$$D < D*w_{1,1} \equiv m_{1,1} (=\{95, 35, 1206\})$$

$$B < B*w_{1,1} \equiv m_{1,1} (=\{\{0, 0, 0\}, \{0, 878\}, \{0, 690\}, \{0\}\})$$

$$M_1=\{m_{1,1}\}=\{1411\} \text{ and } W_1=\{w_{1,1}\}=\{878\} \text{ and } W^{-1}_1=\{w^{-1}_{1,1}\}=\{728\}$$

The actual algorithm in generating w's calls Random( ), but the calls are not explicitly described here. Therefore si in SEQ is sometimes implicitly decremented and seeds may be consumed.

As $c_2=1$, the second section will be wrinkled. First, the elements of the second section are generated: $((\text{sum}(B)+\text{sum}(D)))*(2^h-1)+\text{Random}(1, 8)=((878+690)+(95+35+1206)*3+2=8714$. I.e. $A=\{21, 82, 326, 8714, 8714\}$ and $D=\{95, 35, 1206, 8714, 8714\}$, then wrinkling is applied, i.e. $B_2=\{0, 878\}$ is added to the second section of A and to the second section of D, the key being transformed, namely $\{8714, 8714\}$. Then $A=\{21, 82, 326, 8714, 9592\}$ and $D=\{95, 35, 1206, 8714, 9592\}$. Since $B_2$ is already utilized in wrinkling the second section, it is set to 0, i.e. $B_2 < \{0, 0\}$.

The next modulus is calculated as: $m_{2,1} < ((\text{sum}(B)+\text{sum}(D)))*(2^h-1)+\text{Random}(1, 256)=(690+(95+35+1206+8714+9592))*3+191=61187$. Then $w_{2,1}=56426$ and $w^{-1}_{2,1}=3380$ are generated in the same way as describe before. B and D again are iterated so that B and D now contains:

$B=\{\{0, 0, 0\}, \{0, 0\}, \{0, 19008\}, \{0\}\}$ $D=\{37201, 16926, 9812, 58619, 39177\}$ and:

$M=\{M_1, M_2\}=\{\{m_{1,1}\}, \{m_{2,1}\}\}=\{\{1411\}, \{61187\}\}$ $W=\{W_1, W_2\}=\{\{w_{1,1}56\}, \{w_{2,1}\}\}=\{\{878\}, \{56426\}\}$ $W^{-1}=\{W^{-1}_1, W^{-1}_2\}=\{\{w^{-1}_{1,1}\}, \{w^{-1}_{2,1}\}\}=\{\{728\}, \{3380\}\}$

The third section is obtained similarly:

$A=\{21, 82, 326, 8714, 9592, 542234, 542234\}$ $B=\{\{0, 0, 0\}, \{0, 0\}, \{0, 0\}, \{0\}\}$ $D=\{37201, 16926, 9812, 58619, 39177, 542234, 542234\}$ $M=\{M_1, M_2, M_3\}=\{\{m_{1,1}\}, \{m_{2,1}\}, \{\}\}=\{\{1411\{, \{61187\}, \{\}\}$ $W=\{W_1, W_2, W_3\}=\{\{w_{1,1}\}, \{w_{2,1}\}, \{\}\}=\{\{878\}, \{56426\}, \{\}\}$ $W^{-1}=\{W^{-1}_1, W^{-1}_2, W^{-1}_3\}=\{\{w^{-1}_{1,1}\}, \{w^{-1}_{2,1}\}, \{\}\}=\{\{728\{, \{3380\}, \{\}\}$

As the third section is not iterated (by assumption 7), $M_3$, $W_3$ and $W^{-1}_3$ are empty. Then after applying wrinkling:

$A=\{21, 82, 326, 8714, 9592, 542234, 561242\}$ $B=\{\{0, 0\}, \{0, 0\}, \{0, 0, 0\}, \{0\}\}$ $D=\{37201, 16926, 9812, 58619, 39177, 542234, 561242\}$ $M=\{M_1, M_2, M_3\}=\{\{m_{1,1}\}, \{m_{2,1}\}, \{\}\}=\{\{1411\}, \{61187\}, \{\}\}$ $W=\{W_1, W_2, W_3\}=\{\{w_{1,1}\}, \{w_{2,1}\}, \{\}\}=\{\{878\}, \{56426\}, \{\}\}$ $W^{-1}=\{W^{-1}_1, W^{-1}_2, W_{-13}\}=\{\{w_{-11,1}\}, \{w^{-1}_{2,1}\}, \{\}\}=\{\{728\}, \{3380\}, \{\}$

Next the fuzzy residue for the third sections is generated: $\text{Random}(1, 1000)=666$.

Since no iteration is to be performed on the third section, the last section (a single element) is generated:

$\text{sum}(D)*(2^h-1)+\lambda*666+\text{Random}(1, 8)=3804299$ where $\lambda$ is greater than or equal to the maximum multiple, according to the mapping defined in Assumption 19, the fuzzy residue (666) can be applied. In this example $\lambda=13$. The larger $\lambda$ is to allow room for a larger number of different mapping to provide message specific encryption without the need for change in the key set or the fuzzy residue set.

The fuzzy residue for the last element of the last section is: $3804299-\lfloor 3804299 \div 3 \rfloor = 2536200$, by assumption 21.

$B=0$ will be ignored from now on, because it has no effect on the rest of the key generation process. At this stage, the various parameters are as follows:

$A=\{21, 82, 326, 8714, 9592, 542234, 561242, 3804299\}$ $F=\{666, 2536200\}$ $D=\{37201, 16926, 9812, 58619, 39177, 542234, 561242, 3804299\}$ $M=\{M_1, M_2, M_3\}=\{\{m_{1,1}\}, \{m_{2,1}\}, \{\}\}=\{\{1411\}, \{61187\{, \{\}\}$ $W=\{W_1, W_2, W_3\}=\{\{w_{1,1}\}, \{w_{2,1}\}, \{\}\}=\{\{878\}, \{56426\}, \{\}\}$ $W^{-1}=\{W^{-1}_1, W^{-1}_2, W^{-1}_3\}=\{\{w^{-1}_{1,1}\}, \{w^{-1}_{2,1}\}, \{\}\}=\{\{728\}, \{3380\}, \{\}\}$

As $t_{k=4}=2$, two more iterations need to be performed on D, and $m_{4,1}=53277556$, $w_{4,1}=6178291$, and $w^{-1}_{4,1}=21375375$ are obtained for the first of the two iterations. After this first iteration, the parameters are as follows:

$A=\{21, 82, 326, 8714, 9592, 542234, 561242, 3804299\}$ $F=\{12369994, 26194152\}$ $D=\{52504463, 43188594, 44810120, 37691997, 6969599, 39998370, 53220274, 331112937\}$ $M=\{M_1, M_2, M_3, M_4\}=\{\{m_{1,1}\}, \{m_{2,1}\}, \{\}, \{m_{4,1}\}\}=\{\{,1411\}, \{61187\}, \{\}, \{53277556\}\}$ $W=\{W_1, W_2, W_3, W_4\}=\{\{w_{1,1}\}, \{w_{2,1}\}, \{\}, \{w_{4,1}\}\}=\{\{878\}, \{56426\}, \{\}, \{6178291\}\}$ $W^{-1}=\{W^{-1}_1, W^{-1}_2, W^{-1}_3, W^{-1}_4\}=\{\{w^{-1}_{1,1}\}, \{w^{-1}_{2,1}\}, \{\},\{w^{-1}_{4,1}\}\}=\{\{728\}, \{3380\}, \{\}, \{21375375\}\}$

After the last iteration with $m_{4,2}=1809832417$ and $w_{4,2}=2085440329$, the final results are:

$A=\{21, 82, 326, 8714, 9592, 542234, 561242, 3804299\}$ $F=\{221933612, 808030227\}$ $D=\{20053732, 624037339, 480756407, 747752389, 133089836, 623579574, 602702862, 683922441\}$ $M=\{M_1, M_2, M_3, M_4\}=\{\{m_{1,1}56\}, \{m_{2,1}\}, \{\}, \{m_{4,1}, m_{4,2}\}\}=\{\{1411\}, \{61187\}, \{\}, \{53277556, 1809832417\}\}$ $W=\{W_1, W_2, W_3, W_4\}=\{\{w_{1,1}\}, \{w_{2,1}\}, \{\}, \{w_{4,1}, w_{4,2}\}\}=\{\{878\}, \{56426\}, \{\}, \{6178291, 2085440329\}\}$ $W^{-1}=\{W^{-1}, W^{-1}_2, W^{-1}_3, W^{-1}_4\}=\{\{w^{-1}_{1,1}\}, \{w_{-12,1}\}, \{\}, \{w^{-1}_{4,1}, w^{-1}_{4,2}\}\}=\{\{728\}, \{3380\}, \{\}, \{21375375, 908436921\}\}$

It is as assumed that, for simplicity, an order reversing permutation P is used such that $P((x_1, x_2, \ldots, x_n))=(x_n, x_{n-1}, \ldots, x_2, x_1)$ for any sequence $x_1, x_2, \ldots, x_n$. Therefore, the permuted D is the public key vector. In response to the permutation of D, the fuzzy residue mapping will be adjusted accordingly. F and the mapping of assumptions 18 and 19 will be made known to the encryptor. A, M, W. $W^{-1}$, the original wrinkling sets $\{\{0, 0, 0\}, \{0, 1\}, \{0, 4\}, \{0\}\}$, the original fuzzy residue set $\{666, 2536200\}$, and the mapping of assumptions 18 and 19, are collectively the decryption key. A is the private key vector.

The example that follows demonstrate the encryption process using the example key generated previously. It is assumed that the data to be encrypted are:

ENGLISH☐OR☐GREEK where ☐ represents a blank space. The encryption process is shown via the construction of one code by turning the first two characters (E and N) into ciphertext. Encryption of other characters can be done in exactly the same way. Again for simplicity, the data are not bi-directionally scrambled. The digital format of the input data in ASCII is:

Hex:45 4E

Binary:0100 0101 0100 1110

By assumption 4, h=2. Therefore the binary bits will be broken into groups of 2:

01 00 01 01 01 00 11 10 each of the bit groups in decimal is: 1, 0, 1, 1, 1, 0, 3, and 2. In vector form, they are (1, 0, 1, 1, 1, 0, 3, 2) and are used to produce an inner product with the public key vector (683922441, 602702862, 623579574, 133089836, 747752389, 480756407, 624037339, 20053732). The last (and only) element of the last section is 683922441, and the corresponding fuzzy residue is 808030227. The value of the corresponding bit group is 1 and, based on assumption 18, the mapped (multiple) value is 2. The fuzzy residue corresponding to the third section is 21933612. The sum of the bit group values of the third section is 0+1=1, and the mapped (multiple) value, according to assumption 19, is 3. Therefore, encrypted code for 0100010101001110 is:

```
  1*683922441 + (2*808030227)
+ 0*602702862 + 1*623579574 + (3*21933612)
+ 1*133089836 + 1*747752389
+ 0*480756407 + 3*624037339 + 2*20053732
= 5782425011
```

Next, the decryption process is demonstrated as follows by using the encrypted code (5782425011) obtained previously:

```
Since, t_{k=4} = 2, M_4 = {m_{4,1}, m_{4,2}} = {53277556, 1809832417}
and W^{-1}_4 = {w^{-1}_{4,1}, w^{-1}_{4,2}}
= {21375375, 908436921} will be used to inverse iterate the code:
  5782425011*908436921 ☰ 1809832417 = 441845897
  441845897*21375375 ☰ 53277556 = 9643907
```

Now the last section is 'exposed' and the quotient of $q_4 = \lfloor 9643907 \div a_{4,1} \rfloor = \lfloor 9643907 \div 3804299 \rfloor = 2$ is obtained. The x (satisfying $\rfloor(x*a_{4,1}+SM_4(x)*f_2) \div a_{4,1}, =2=q_4$) is 1. Therefore, the multiple of the (only) element of the last section is 1, and the corresponding decrypted bit group is 01. The multiple of fuzzy residue 2536200 is $SM_4(x)=SM_4(1)=$ 2. 1*3804299 and 2*2536200 are subtracted from 9643907 and the processed code becomes 767208.

As $M_3$, $W_3$ and $W^{-1}_3$ are empty, no inverse iteration will be performed on the code.

The next two sections are wrinkled (as $c_3$ and $c_2$ are not zero), and the bit patterns can not be recovered right away but have to be delayed in the recovery. For the third section, the so far processed code is divided by the first element of third section of the private key set, yielding a quotient:

$\lfloor 767208 \div 542234 \rfloor = 1$

The multiples of 542234 in 767208 is 1, which will be remembered for later steps of delayed bit recovery and the multiples (3) of fuzzy residue 666 contained is determined in the same way as for the last section. 1*542234 and 3*666 are subtracted from 767208 leaving 222976. Since the second section is iterated, inverse iteration is performed on 222976 with $m_{2,1}$=61187 and $W^{-1}_{2,1}$=3380 to obtain 18601.

The so far processed code (18601) is then divided by the first element of the second section of the private key set to get the quotient:

$\lfloor 18601 \div 8714 \rfloor = 2$

The quotient is also remembered for later steps of delayed bit recovery. 2*8714 is subtracted from 18601 to obtain 1173 which, after the inverse iteration by $m_{1,1}$=1411 and $W^{-1}_{1,1}$=728, becomes 289 for the first section that is not wrinkled and the data bits can be recovered:

| | |
|---|---|
| $\lfloor 289 \div 326 \rfloor = 0$ | (bit pattern is 00) |
| $\lfloor 289 \div 82 \rfloor = 3$ | (bit pattern is 11, forming 0011 with the just recovered bits) |
| 289 −3 * 82 = 43 | |
| $\lfloor 43 \div 21 \rfloor = 2$ | (bit pattern is 10, forming 001110 with the other recovered bits) |
| 43 − 2 * 21 = 1 | |

At this point, the recovery of the delayed bit patterns can be performed. As the remnant of the code is 1 which corresponds to the wrinkling set element 1 and is added, after iterations, to the second element of the second section. Therefore, the data bit groups of the second section have a bit pattern 01 xx and those of the third section have a bit pattern of 00 xx. The xx are the bits whose values are still not known. With the help of the quotients recovered and remembered during earlier steps, the bits can be obtained.

By the construction of the key elements, it is easy to show that the total number of the first (smallest) element in a wrinkled section of the decryption key set the code can contain (when that section is reached at and 'exposed' in the decoding process) is exactly the sum of the multiples of all elements in that section contributed to the subset sum. So the value of xx is just the quotient obtained earlier for that section minus the sum of the values of the delay recovered bit groups. As the quotient for the second section is 2 and the sum of the values of recovered and known multiples is 1 (01 in 01 xx), xx equals 2−1=1 (01). Similarly, quotient for the third section is 1 and the sum of the values of recovered and known multiples is 0 (00 in 00 xx), xx equals 1−0=(01).

The bit pattern for sections 4 down to 2 are thus recovered: 01 00 01 01 01. Together with the bit pattern for the first section (00 11 10), the entire recovered bit pattern is 01 00 01 01 01 00 11 10, which is 45 4E in hexadecimal (or E and N in ASCII), the original data. The inverse permutation is not performed in this particular example simply because the bit groups have been decrypted 'from left to right', which works as the inverse permutation automatically.

I claim:

1. A cryptographic method comprising the steps of:

providing a plurality of key section construction methods;

deriving a decryption key including a decryption key set of identifiables logically segregated into sections, each said section generated by one of a plurality of construction methods and said segregation is kept secret;

deriving from said decryption key an encryption key, each section of said decryption key set is transformed to a corresponding section of said encryption key set and at least two said sections are transformed under different transformation methods, and previously generated and transformed sections are transformed together with the currently generated section;

accepting a message in the form of an input sequence of integers;

converting said encryption key set to a key vector and converting said input sequence of integers to at least one data vector having the same dimensions as said key vector;

generating ciphertext by computation that includes calculating the inner product of each of said data vectors with said key vector;

accepting a ciphertext; and decrypting said ciphertext to recover said message.

2. A cryptographic method as in claim 1 further comprising the steps of:

deriving the decryption key including a decryption fuzzy residue set;

deriving a fuzzy residue mapping whereby elements of said decryption key set and elements of said decryption fuzzy residue set are associated for decryption;

deriving from said decryption key the encryption key including an encryption fuzzy residue set from said decryption fuzzy residue set, inheriting said fuzzy residue mapping whereby elements of said encryption key set and elements of said encryption fuzzy residue set are associated for encryption;

generating the ciphertext by computation that includes applying fuzzy residues determined by the values of the integers of said data vectors and in accordance with said fuzzy residue mapping; and decrypting said ciphertext including the removal of fuzzy residues from said ciphertext in accordance with said fuzzy residue mapping to recover said message.

3. A cryptographic method as in claim 1 which securely communicates data from a first party S to a second party R comprising the steps of:

deriving cryptographic keys at party R comprising:

deriving the decryption key to be kept secret at party R, wherein decoding by said decryption key produces one or more solutions for valid ciphertext and detects invalid ciphertext or noise; and deriving from said decryption key the encryption key, wherein said encryption key produces a same ciphertext from different data bits;

distributing said encryption key from party R to party S;

receiving said encryption key at party S;

accepting a message at party S;

generating the ciphertext from said message using said encrption key;

transmitting said ciphertext from party S to party R over a communication channel;

receiving said ciphertext at party R; and decoding said ciphertext at party R to obtain all possible decodes and to recover said message through the identification of valid decodes or through the elimination of any and all invalid decodes by means of a resolution method.

4. A resolution method as in claim 3, used in the decryption of ciphertext having unremovable fuzziness that is encrypted from a message by a first party S and sent from party S to a second party R, for eliminating sets of invalid decodes due to said unremovable fuzziness observing a non-negative integer threshold value, wherein said elimination terminates when the number of sets of invalid decodes falls below said threshold, and wherein said parties adopt a one-way characteristics function H for each cycle of the resolution method by either pre-agreement or by interactive agreement, comprising at least one cycle of the steps of:

generating a random bit sequence s of length zero or more at party R;

transmitting from party R to party S over a communication channel said random bit sequence s and p, the specification of a portion of said message;

receiving s and p at party S;

blending s with the portion of said message specified by p at party S to obtain a blended result b;

calculating at party s characteristics h=H(b);

transmitting h from party S to party R over said communication channel;

receiving h at party R; and repeating at party R for each set of decodes C the steps of:

blending s with the portion of C corresponding to the portion of said message specified by p to obtain a blended result b';

calculating at party R characteristics h'=H(b'); and discarding C if h' does not equal h.

5. A cryptographic method as in claim 1 which securely communicates data from a first party S to a second party R comprising the steps of:

extending said data into a set of public keys at party S;

communicating from party S to party R said extended form of said data over a communication channel; and executing a secure protocol between party S and party R whereby party R extracts said data from its said extended form.

6. A cryptographic method as in claim 5 wherein said data are extended into encryption keys $e_1, e_2, \ldots, e_n$ ($n \geq 1$), each of which can have one or more different corresponding decryption keys $d_{i1}, d_{i2}, \ldots, d_{im}$ ($m \geq 1$), whereby $d_{i1}, d_{i2}, \ldots, d_{im}$ corresponding to $e_i$ give different decipherment to ciphertext produced by $e_i$ comprising the steps of:

extending said data at party S into a set of public encryption keys $e_1, e_2, \ldots, e_n$;

communicating $e_1, e_2, \ldots, e_n$ from party S to party R over a communication channel; and executing a secure protocol between party S and party R whereby party R encrypts using each of $e_1, e_2, \ldots, e_n$ and party S uses $d_{ik}$, for some k wherein $1 \leq k \leq m$, for decryption in said protocol, and whereby party R extracts said data from its said extended form.

7. A cryptographic method as in claim 5 which securely communicates data from a first party S to a second party R comprising the steps of:

accepting the message in the form of a bit sequence at party S;

converting said bit sequence to n numbers $a_1, a_2, \ldots, a_n$ formed by inserting a one bit as the most significant bit to n consecutive variant size bit subsequences of said bit sequence at party S, wherein said sizes are randomly selected;

deriving the decryption key to be kept secret at party S including at least n unique or near-unique sets $D_1, D_2, \ldots, D_n$ as extended decryption key sets corresponding to said n numbers, wherein at least one of the elements in each said extended decryption set is a tangible;

deriving from said decryption key the encryption key at party S by transforming said extended decryption key sets $D_i$ to extended encryption key sets $E_i$ for $1 \leq i \leq n$, wherein one of the tangibles in each extended decryption set $D_i$ is transformed to the corresponding number $a_i$;

distributing said encryption key from party S to party R;
performing at least one cycle of the following steps until each and all $a_i$ in $E_i$, for $1 \leq i \leq n$, are identified by party R via the identification of all elements in $E_i$ that are not $a_i$;
    generating the ciphertext at party R comprising:
        generating random vectors of integers $V_i$ corresponding to $E_i$ for $1 \leq i \leq n$; and
        generating ciphertext $s_i$ by computation that includes calculating the inner product of $V_i$ and $E_i$ for $1 \leq i \leq n$;
    transmitting said ciphertext from party R to party S over a communication channel;
    receiving at party S said ciphertext and recognizing in said $s_i$ the presence or absence of $a_i$ into which said tangible in corresponding $D_i$ is transformed for $1 \leq i \leq n$;
    reporting, via said communication channel, said recognition of the presence or absence by party S to party R; and
    identifying at party R, in response to said reporting, elements in $E_i$ that are not $a_i$ for $1 \leq i \leq n$; and
reassembling and reconstructing said message at party R.

8. A cryptographic method as in claim 1 for information and communication security with the inseparable operation of secure exchange of encryption keys and proper mutual identification and authentication between a first party X and a second party Y comprising the steps of:
    generating at party X public identification encryption key $K_{xip}$, private identification decryption key $K_{xis}$, public encryption key $K_{xp}$, and private decryption key $K_{xs}$ of party X;
    generating at party Y public identification encryption key $K_{yip}$ and private identification decryption key $K_{yis}$ public encryption key $K_{yp}$, and private decryption key $K_{ys}$ of party Y;
    establishing a communication channel between said parties initiated by party X;
    transmitting from party X to party Y over said communication channel $K_{yip}(K_{xp})$;
    receiving $K_{yip}(K_{xp})$ at party Y with a timeout t;
    obtaining $K^1_{xp}$ at party Y through decryption:

$$K^1_{xp} = K_{yis}(K_{yip}(K_{xp}))$$

constructing at party Y a challenge packet $K^1_{xp}(K_{xip} (\beta \cdot K_{yp} \cdot C_y))$, where $C_y$ is a challenge generated by party Y, and $\beta = H(K^1_{xp} \cdot C_y)$ for some one-way characteristics function H and $\cdot$ denotes some appropriate mixing or concatenating function;
    sending from party Y to party X over said communication channel $K^1_{xp}(K_{xip}(\beta \cdot K_{yp} \cdot C_y))$;
    receiving with said timeout t and decrypting $K^1_{xp}(K_{xip} (\beta \cdot K_{yp} \cdot C_y))$ at party X:

$$\beta' \cdot K^1_{yp} \cdot C^1_y = K_{xis}(K_{xs}(K^1_{xp}(K_{xip}(\beta \cdot K_{yp} \cdot C_y))));$$

testing at party X if $\beta'$ equals $H(K_{xp} \cdot C^1_y)$ and failing and aborting the identification/authentication process if $\beta'$ does not equal $H(K_{xp} \cdot C^1_y)$;
    constructing at party X a challenge packet $K^1_{yp}(K_{yip} (\gamma \cdot R_x \cdot C_x))$, where $C_x$ is a challenge by party X, $R_x$ is the reply by party X to party Y in response to $C^1_y$, and $\gamma = H(K^1_{yp} \cdot C_x)$;
    sending from party X to party Y over said communication channel $K^1_{yp}(K_{yip}(\gamma \cdot R_x \cdot C_x))$;
    receiving with said timeout t and decrypting $K^1_{yp}(K_{yip} (\gamma \cdot R_x \cdot C_x))$ at party Y:

$$\gamma' \cdot R^1_x \cdot C^1_x = K_{yis}(K_{ys}(K^1_{yp}(K_{yip}(\gamma \cdot R_x \cdot C_x))));$$

testing at party Y if $\gamma'$ equals $H((K_{yp} \cdot C^1_x)$ and if $R^1_x$ equals $R_x$, and failing and aborting the identification/authentication process if either $\gamma'$ does not equal $H((K_{yp} \cdot C^1_x)$ or $R^1_x$ does not equal $R_x$, where $R_x$ is the expected reply based on $C_y$;
    sending a reply packet $K^1_{xp}(K_{xip}(R_y))$ from party Y to party X over said communication channel, where $R_y$ is the reply by party Y to party X in response to $C^1_x$;
    receiving and decrypting $K^1_{xp}(K_{xip}(R_y))$ at party X:

$$R^1_y = K_{xis}(K_{xs}(K^1_{xp}(K_{xip}(R_y))))$$

testing at party X if $R^1_y$ equals $R_y$ and failing and aborting the identification/authentication process if $R^1_y$ does not equal $R_y$, where $R_y$ is the expected reply based on $C_x$;
    failing and aborting the identification/authentication process whenever
        1) said timeout t expires, or
        2) any decryption fails; and
    providing further protection and security to communication and data transfer with encryption using $K^1_{xp} = K_{xp}$ and $K^1_{yp} = K_{yp}$.

9. An identification/authentication method as in claim 8 adapted for use in a cryptographic system that employs a block cipher as its cryptor, at least one time sensitive transmission block from party X is separated into m>1 portions, $p_1, p_2, \ldots, P_m$, according to a defined or agreed upon method of separation and sent from party X to party Y with a pause $\alpha_j$ after transmitting each $p_j$, for $1 \leq j < m$ where $\Sigma \alpha_j + d \geq t$ and $\Sigma \alpha_i + d < t$ for $1 \leq i < m-1$ and d being the maximum expected delay for the transmission, and at least one time sensitive transmission block from party Y is separated into n>1 portions, $q_1, q_2, \ldots, q_n$, according to a defined or agreed upon method of separation and sent from party Y to party X with a pause $\beta_j$ after transmitting each $q_j$, for $1 \leq j < n$ where $\Sigma \beta_j + d \geq t$ and $\Sigma \beta_i + d < t$ for $1 \leq \beta < n-1$, party X expects $q_1$ within t, and party Y expects $p_1$ within t, and each of said parties reassembles said portions back to said time sensitive transmission block.
    calculating at party S characteristics $h = H(b)$;
    transmitting h from party S to party R over said communication channel;
    receiving h at party R; and
    repeating at party R for each set of decodes C the steps of:
        blending s with the portion of C corresponding to the portion of said message specified by p to obtain a blended result b';
        calculating at party R characteristics $h' = H(b')$; and
        discarding C if h' does not equal h.

10. A cryptographic method which securely communicates data from a first party S to a second party R comprising the steps of:
    deriving cryptographic keys at party R comprising:
        providing a plurality of key section construction methods;
        deriving a decryption key to be kept secret at party R including a decryption key set of identifiables logically segregated into sections, each section generated by one of a plurality of construction methods and said segregation is kept secret;
        deriving from said decryption key an encryption key, each section of said decryption key set is transformed to a corresponding section of said encryption key set, and at least two sections are transformed under different transformation methods, and previously generated and transformed sections are transformed together with the currently generated section;

distributing said encryption key from party R to party S;

receiving said encryption key at party S;

generating ciphertext at party S comprising:
  accepting a message in the form of an input sequence of integers;
  converting said encryption key set to a key vector and converting said input sequence of integers to at least one data vector having the same dimensions as said key vector; and
  generating ciphertext by computation that includes calculating the inner product of each of said data vectors with said key vector;

transmitting said ciphertext from party S to party R over a communication channel;

receiving said ciphertext at party R; and decrypting said ciphertext at party R to recover said message.

11. A cryptographic method as in claim 10 which securely communicates data from a first party S to a second party R further comprising the steps of:

deriving the decryption key including a decryption fuzzy residue set to be kept secret at party R;

deriving a fuzzy residue mapping to be kept secret at party R whereby elements of said decryption key set and elements of said decryption fuzzy residue set are associated for decryption;

deriving at part R from said decryption key the encryption key including an encryption fuzzy residue set from said decryption fuzzy residue set, inheriting said fuzzy residue mapping whereby elements of said encryption key set and elements of said encryption fuzzy residue set are associated for encryption;

generating at party S the ciphertext by computation that includes applying fuzzy residues determined by the values of the integers of said data vectors and in accordance with said fuzzy residue mapping; and decrypting said ciphertext at party R including the removal of fuzzy residues from said ciphertext in accordance with said fuzzy residue mapping to recover said message.

12. A cryptographic method comprising the steps of:

deriving a decryption key by generating a decryption key set of identifiables logically segregated into k>1 sections:

$$K_d = K_{d_1} \cup K_{d_2} \cup \ldots \cup K_{d_k} \text{ (where } K_{d_j} \text{ for } 1 \leq j \leq k \text{ is a section)}$$
$$= \{d_{1,1}, d_{1,2}\ldots, d_{1,z_1}, d_{2,1}, d_{2,2}\ldots d_{2,z_2}, \ldots, d_{k,1}, d_{k,2}, \ldots, d_{k,z_k}\}$$

and a decryption fuzzy residue set with corresponding sections to $K_d$:

$$G = G_1 \cup G_2 \cup \ldots \cup G_k$$

and a wrinkling set with corresponding sections to $K_d$:

$$B = B_1 \cup B_2 \cup \ldots \cup B_k$$

where $K_d$, G and B are to be kept secret and each section i, for $1 \leq i \leq k$ is $K_d$ is generated by at least one of the following constructions:

1) standard
2) submerged
3) wrinkled
4) individually mapped
5) multiply mapped and for a submerged section i
  $d_{i,j} = 2^{h(j-1)} * m_l$, for $1 \leq j \leq z_i$, where subscript i in $m_l$ is defined to be: $i \equiv i$, $0 \equiv i-1$, $z_{i-1}$ and for a wrinkled section i
  $\sigma = \text{sum}(\eta_\theta * |\theta|) + r$
  $d_{i,j} = \sigma + \Psi_{i-1}(b_{i,j})$, for $1 \leq j \leq z_i$ and for a section of any of the other types:

$$d_{i,j} = \sum_{\theta \in \Theta_{i-1}} \eta_\theta * |\theta| + (2^h - 1) \sum_{t=1}^{j-1} d_{i,t} + r, \quad \text{for } 1 \leq j \leq z_i$$

where r is a non-zero positive ranged random number, $\eta_\theta$ is the maximum applicable multiple of $\theta \in \Theta_{i-1}$, and $\Theta_i$ is defined to be $$\Theta_i = \Theta_{i,0} = \Psi_i\left(\bigcup_{j=1}^i (K_{d_j}) \cup \bigcup_{j=1}^i (G_j) \cup \bigcup_{j=i+1}^k (B_j)\right), \text{ for } 0 \leq i \leq k$$

where $\Psi_i(X \cup Y) = \Psi_i(X) \cup \Psi_i(Y)$, for any sets $X$ and $Y$ $\Psi_i(S) = \{\Psi_i(s_1), \Psi_i(s_2), \ldots, \Psi_i(s_n)\}$ for any set $S = \{s_1, s_2, \ldots, s_n\}$ $\Psi_i = \Gamma_i \circ \Gamma_{i-1} \circ \ldots \circ \Gamma_1$ $\Gamma_j = \Gamma_{j,t_j} \circ \Gamma_{j,t_j-1} \circ \ldots \circ \Gamma_{j,1}$ $$\Gamma_{u,v}(\mu) = \begin{cases} \mu & \text{if } u = 0 \text{ or if } \mu \text{ is } d_{i,j} \text{ or } g_{i,j} \text{ where } i > u \\ C_{u,v}(w_{u,v} * \mu) \Xi m, & \text{otherwise} \end{cases}$$

$(w_{u,v}, m_{u,v}) = 1$ $$m_{u,v} > \sum_{\theta \in \overline{\Theta}_{u,v-1}} \eta_\theta * |\theta|$$

$\overline{\Theta}_{u,v} = \Gamma_{u,v} \circ \Gamma_{u,v-1} \circ \ldots \circ \Gamma_{u,1}(\overline{\Theta}_{u-1})$, and $\overline{\Theta}_u = (\Theta_{u-1} \cup K_{d_u} \cup G_u) - \Psi_{u-1}(B_u)$ where $C_{u,v}(\{\mu_1, \mu_2, \ldots, \mu_n\}) = \{C_{u,v}(\mu_1), C_{u,v}(\mu_2), \ldots, C_{u,v}(\mu_n)\}$ denotes a complementation function for the construction of the entire encryption key and $C_{u,v}(\mu)$, for any number $\mu$, is either defined to be:

$\mu + m_{u,v}$    if $\mu < -\dfrac{m_{u,v}}{2}$ or $\mu - m_{u,v}$    if $\mu > \dfrac{m_{u,v}}{2}$ or $\mu$ otherwise and $g \in G$ is a ranged random number;

deriving fuzzy residue mapping FM( ), whereby elements of said key sets are associated with elements of said fuzzy residue set, and FM( ), for a section i having at least one element individually mapped, is defined to be:

$$FM(X) = \sum_{i=1}^k \sum_{j=1}^{z_j} IM(x_{i,j})$$

satisfying $IM(\mu-1) = (\mu-1)*d_{i,j} < IM(\mu) + \mu*d_{i,j} < IM(\mu+1) + (\mu+1)*d_{i,j}$, where $X = X_1 \cup X_2 \cup \ldots \cup X_k$ is a set of integers in the ranges of $[0, 2^h)$ input to FM( ) and $x_{i,j}$ corresponds to $e_{i,j}$ and $IM(x_{i,j})$ equals the value of applied residues mapped to by $x_{i,j}$,
and FM( ), for a section i having elements multiply mapped, is defined to be:

$$FM(X)=FM(X_1 \cup X_2 \cup \ldots \cup X_k)=FM(X_1)+FM(X_2)+\ldots+FM(X_k)$$

where $FM(X_i)=SM(\Sigma IM(x_{i,j}))$ for $1 \leq j \leq z_i$ and $IM(x_{i,j})$ equals $x_{i,j}$ if $e_{i,j}$ is mapped and equals zero otherwise, and $SM(\mu)$ returns $\alpha^* g_{i,j}$ for some integer $\alpha$ corresponding to the value of $\mu$ satisfying:

$$SM(\mu-1)<SM(\mu)<SM(\mu+1);$$

deriving from said decryption key an encryption key $\theta_k$, inheriting said fuzzy residue mapping;
generating ciphertext comprising:
  accepting a message in the form of an input sequence of integers in the range of $[0, 2^h)$;
  converting said encryption key set to a key vector and converting said input sequence of integers to at least one data vector X having the same dimensions as said key vector; and
  generating ciphertext by computation that includes calculating the inner product of each of said data vectors with said key vector defined by:

$$\gamma = K_e \times X + FM(X)$$

if fuzzy residues have been generated for said encryption key, and defined by:

$$\gamma = K_e \times X$$

otherwise;
  obtaining a decryption key;
  decrypting said ciphertext to recover said message via decrypting each of the ciphertext block of said ciphertext, and corresponding to a standard section i of said encryption key set, the decryption is carried out according to:

$$\gamma' \ll \Gamma_i^{-1}(\gamma')$$

$$y_{i,j} \ll \left\lfloor \frac{\gamma' - \sum_{m=j+1}^{z_i}(y_{i,m} * d_{i,m})}{d_{i,j}} \right\rfloor, \quad \text{for } 1 \leq j \leq z_i$$

and after obtaining all $y_{i,j}$ for $1 \leq j \leq z_i$, is adjusted by:

$$\gamma' \ll \gamma' - \sum_{j=1}^{z_i}(y_{i,j} * d_{i,j})$$

and corresponding to a submerged section i, the decryption is carried out according to:

$$\gamma' \ll \Gamma_i^{-1}(\gamma')$$

$$y_{i,j} \ll \frac{\gamma' - Y' \times \Omega}{2^{h(j-1)} * m_{i-1,t_{i-1}}}$$

where $\Omega$ is the set of elements in $\theta_{i-1}$ that are tranformed from said decryption key set and Y' is the decrypted $\{y_{1,1}, y_{1,2}, \ldots y_{i-1,\mu}\}$, where $\mu = z_{1-1}$,
and corresponding to a wrinkled section i, the decryption is carried out according to:

$$\gamma' \ll \Gamma_i^{-1}(\gamma')$$

$$q_i \ll \left\lfloor \frac{\gamma'}{d_{i,1}} \right\rfloor$$

$$y_{i,j} \ll b'_{i,j}, \quad \text{for } 1 < j \leq z_i$$

$$y_{i,1} \ll q_i - \sum_{j=2}^{z_i}(y_{i,j})$$

where $b'_{i,j}$ is the decoded multiple of identifiable $b_{i,j}$ contained in $\gamma'$, and after obtaining $q_i$, $\gamma'$ is adjusted by: $\gamma' \leftarrow \gamma' - q_i * d_{i,1}$.
and corresponding to an individually mapped section i, the decryption is carried out, for $j=z_i$ down to 1, according to:

$$\gamma' < \Gamma_i^{-1}(\gamma')$$

$$y_{i,j} < q,$$

satisfying:

$$FM(q-1)+(q-1)*d_{i,j} \leq FM(q)+q*d_{i,j} < FM(q+1)+(q+1)*d_{i,j}$$

and after obtaining each $y_{i,j}$, $\gamma'$ is adjusted by:

$$\gamma' < \gamma' - FM(y_{i,j}) - y_{i,j}*d_{i,j}$$

and corresponding to a multiply mapped section i, the decryption is carried out, for $j=z_i$ down to 1, according to:

$$\gamma' < \Gamma_i^{-1}(\gamma')$$

$y_{i,j}<q$, satisfying:

$$FM(q)+q*d_{i,j} \leq \gamma'$$

and after obtaining each $y_{i,j}$, $\gamma'$ is adjusted by:

$$\gamma' \ll \gamma' - y_{i,j}*d_{i,j} - \left(SM\left(\sum_{m=j}^{z_i} IM(y_{i,m})\right)\right) - \left(SM\left(\sum_{m=j+1}^{z_i} IM(y_{i,m})\right)\right)$$

where for the decryption of section k, the last generated section of the decryption key set, $\gamma'$ equals the ciphertext $\gamma$ to be decrypted and $$\Gamma_i^{-1} = \Gamma_{i,1}^{-1} \circ \Gamma_{i,2}^{-1} \circ \ldots \circ \Gamma_{i,t_i}^{-1}$$

$$\Gamma_{u,v}^{-}(\mu) = C_{u,v}^{-1}((w_{u,v}^{-1}\mu) \Xi m_{u,v})$$

$C_{u,v}^{-1}$ denotes the reverse of $C_{u,v}$, where $C_{u,v}^{-1}(\mu)$, for any number $\mu$, is defined as:

$\mu + m_{u,v} \quad$ if $\mu < -NEG_{u,v}$ or $\mu - m_{u,v} \quad$ if $\mu > POS_{u,v}$ or $\mu$ otherwise $$NEG_{u,v} = \sum_{\substack{\theta<0 \\ \theta \in \Theta_{u,v-1}}} \theta$$

$$POS_{u,v} = \sum_{\substack{\theta>0 \\ \theta \in \Theta_{u,v-1}}} \theta.$$

13. A cryptographic system comprising:
means for providing a plurality of key section construction methods;
means for deriving a decryption key including a decryption key set of identifiables logically segregated into sections, each said section generated by one of a plurality of construction methods and said segregation is kept secret;
means for deriving from said decryption key an encryption key, each section of said decryption key set is transformed to a corresponding section of said encryption key set and at least two said sections are transformed under different transformation methods, and previously generated and transformed sections are transformed together with the currently generated section;
means for accepting a message in the form of an input sequence of integers;
means for converting said encryption key set to a key vector and converting said input sequence of integers to at least one data vector having the same dimensions as said key vector;
means for generating ciphertext by computation that includes calculating the inner product of each of said data vectors with said key vector.
means for accepting a ciphertext; and
means for decrypting said ciphertext to recover said message.

14. A cryptographic system as in claim 13 further comprising:
means for deriving the decryption key including a decryption fuzzy residue set;
means for deriving a fuzzy residue mapping whereby elements of said decryption key set and elements of said decryption fuzzy residue set are associated for decryption;
means for deriving from said decryption key the encryption key including an encryption fuzzy residue set from said decryption fuzzy residue set, inheriting said fuzzy residue mapping whereby elements of said encryption key set and elements of said encryption fuzzy residue set are associated for encryption;
means for generating the ciphertext by computation that includes applying fuzzy residues determined by the values of the integers of said data vectors and in accordance with said fuzzy residue mapping; and
means for decrypting said ciphertext including the removal of fuzzy residues from said ciphertext in accordance with said fuzzy residue mapping to recover said message.

15. A cryptographic system which securely communicates data from a first party S to a second party R comprising:
means for deriving cryptographic keys at party R comprising:
means for providing a plurality of key section construction methods;
means for deriving a decryption key to be kept secret at party R including a decryption key set of identifiables logically segregated into sections, each section generated by one of a plurality of construction methods and said segregation is kept secret;
means for deriving from said decryption key an encryption key, each section of said decryption key set is transformed to a corresponding section of said encryption key set, and at least two said sections are transformed under different transformation methods, and previously generated and transformed sections are transformed together with the currently generated section;
means for distributing said encryption key from party R to party S;
means for obtaining said encryption key at party S;
means for generating ciphertext at party S comprising:
means for accepting a message in the form of an input sequence of integers;
means for converting said encryption key set to a key vector and converting said input sequence of integers to at least one data vector having the same dimensions as said key vector; and
means for generating ciphertext by computation that includes calculating the inner product of each of said data vectors with said key vector;
means for transmitting said ciphertext from party S to party R over a communication channel;
means for receiving said ciphertext at party R; and
means for decrypting said ciphertext at party R to recover said message.

16. A cryptographic system as in claim 15 which securely communicates data from a first party S to a second party R further comprising:
means for deriving the decryption key including a decryption fuzzy residue set to be kept secret at party R;
means for deriving a fuzzy residue mapping to be kept secret at party R whereby elements of said decryption key set and elements of said decryption fuzzy residue set are associated for decryption;
means for deriving at party R from said decryption key the encryption key including an encryption fizzy residue set from said decryption fuzzy residue set, inheriting said fuzzy residue mapping whereby elements of said encryption key set and elements of said encryption fuzzy residue set are associated for encryption;
means for generating at party S the ciphertext by computation that includes applying fuzzy residues determined by the values of the integers of said data vectors and in accordance with said fuzzy residue mapping; and
means for decrypting said ciphertext at party R including the removal of fuzzy residues from said ciphertext in accordance with said fuzzy residue mapping to recover said message.

17. A cryptographic system comprising:
means for deriving a decryption key by generating a decryption key set of identifiables logically segregated into k>1 sections:

$$K_d = K_{d_1} \cup K_{d_2} \cup \ldots \cup K_{d_k} \text{ (where } K_{d_j} \text{ for } 1 \leq j \leq k \text{ is a section)}$$

$$= \{d_{1,1}, d_{1,2} \ldots, d_{1,z_1}, d_{2,1}, d_{2,2} \ldots d_{2,z_2}, \ldots, d_{k,1}, d_{k,2}, \ldots, d_{k,z_k}\}$$

and a decryption fuzzy residue set $G = G_1 \cup G_2 \cup \ldots \cup G_k$ and a wrinkling set $B = B_1 \cup B_2 \cup \ldots \cup B_k$ with sections corresponding to those in $K_d$, wherein $K_d$, G and B are to be kept secret and each section i, for $1 \leq i \leq k$ of $K_d$ is generated by at least one of the following constructions:
1) standard
2) submerged
3) wrinkled 4) individually mapped
5) multiply mapped
and for a submerged section i
$d_{i,j}=2^{h(j-1)}*m_i$, for $1\leq j\leq z_i$, where subscript i and $m_i$ is defined to be: i≡i, 0≡i−1, $z_{i-1}$
and for a wrinkled section i
$\sigma=\text{sum}(\eta_\theta*|\theta|)+r$
$d_{i,j}=\sigma+\Psi_{i-1}(b_{i,j})$, for $1\leq j\leq z_i$
and for a section of any of the other types:

$$d_{i,j} = \sum_{\theta\in\Theta_{i-1}} \eta_\theta*|\theta| + (2^h-1)\sum_{t=1}^{j-1} d_{i,t} + r, \quad \text{for } 1\leq j\leq z_i$$

where r is a non-zero positive ranged random number, $\eta_\theta$ is the maximum applicable multiple of $\theta\in\Theta_{i-1}$, and $\Theta_i$ is defined to be $$\Theta_i = \Theta_{i,0} = \Psi_i\left(\bigcup_{j=1}^i (K_{d_j}) \cup \bigcup_{j=1}^i (G_j) \cup \bigcup_{j=i+1}^k (B_j)\right), \quad \text{for } 0\leq i\leq k$$

where $\Psi_i(X\cup Y)=\Psi_i(X)\cup\Psi_i(Y)$, for any sets $X$ and $Y$ $\Psi_i(S)=\{\Psi_i(s_1), \Psi_i(s_2), \ldots, \Psi_i(s_n)\}$ for any set $S=\{s_1, s_2, \ldots, s_n\}$ $\Psi_i = \Gamma_i \circ \Gamma_{i-1} \circ \ldots \circ \Gamma_1$ $\Gamma_j = \Gamma_{j,t_j} \circ \Gamma_{j,t_j-1} \circ \ldots \circ \Gamma_{j,1}$ $$\Gamma_{u,v}(\mu) = \begin{cases} \mu & \text{if } u=0 \text{ or if } \mu \text{ is } d_{i,j} \text{ or } g_{i,j} \text{ where } i>u \\ C_{u,v}(w_{u,v}*\mu)\equiv m, & \text{otherwise} \end{cases}$$

$(w_{u,v}, m_{u,v}) = 1$ $$m_{u,v} > \sum_{\theta\in\overline{\Theta}_{u,v-1}} \eta_\theta*|\theta|$$

$\overline{\Theta}_{u,v} = \Gamma_{u,v}\circ\Gamma_{u,v-1}\circ\ldots\circ\Gamma_{u,1}(\overline{\Theta}_{u-1})$, and $\overline{\Theta}_u = (\Theta_{u-1}\cup K_{d_u}\cup G_u) - \Psi_{u-1}(B_u)$ where $C_{u,v}\{\mu_1, \mu_2, \ldots, \mu_n\})=\{C_{u,v}(\mu_1), C_{\mu,v}(\mu_2), \ldots, C_{u,v(\mu n)}\}$ denotes a complementation function for the construction of the entire encryption key and $C_{u,v}(\mu)$, for any number $\mu$, is either defined to be:

$$\begin{cases} \mu + m_{u,v} & \text{if } \mu < -\frac{m_{u,v}}{2} \text{ or} \\ \mu - m_{u,v} & \text{if } \mu > \frac{m_{u,v}}{2} \text{ or} \\ \mu & \text{otherwise} \end{cases}$$

and $g\in G$ is a ranged random number;
means for deriving fuzzy residue mapping FM( ), whereby elements of said key sets are associated with elements of said fuzzy residue set, and FM( ), for a section i having at least one element individually mapped, is defined to be:

$$FM(X) = \sum_{i=1}^k \sum_{j=1}^{z_i} IM(x_{i,j})$$

satisfying $IM(\mu-1)+(\mu-1)*d_{i,j}<IM(\mu)+\mu*d_{i,j}<IM(\mu+1)+(\mu+1)*d_{i,j}$, where $X=X_1\cup X_2\cup\ldots\cup X_k$ is a set of integers in the ranges of $[0, 2^h)$ input to FM( ) and $x_{i,j}$ corresponds to $e_{i,j}$ and $IM(x_{i,j})$ equals the value of applied residues mapped to by $x_{i,j}$,
and FM( ), for a section i having elements multiply mapped, is defined to be: $FM(X)=FM(X_1\cup X_2\cup\ldots\cup X_k)=FM(X_1)+FM(X_2)+\ldots+FM(X_k)$ where $FM(X_i)=SM(\Sigma IM(x_{i,j}))$ for $1\leq j\leq z_i$ and $IM(x_{i,j})$ equals $x_{i,j}$ if $e_{i,j}$ is mapped and equals zero otherwise, and $SM(\mu)$ returns $\alpha*g_{i,1}$ for some integer $\alpha$ corresponding to the value of $\mu$ satisfying:

$$SM(\mu-1)<SM(\mu)<SM(\|+1);$$

means for deriving from said decryption key an encryption key $\Theta_k$, inheriting said fuzzy residue mapping,
means for obtaining an encryption key;
means for generating ciphertext comprising:
means for accepting a message in the form of an input sequence of integers in the range of $[0, 2^h)$;
means for converting said encryption key set to a key vector and converting said input sequence of integers to at least one data vector having the same dimensions as said key vector; and
means for generating ciphertext by computation that includes calculating the inner product of each of said data vectors with said key vector defined by:

$$\gamma=K_e\times X+FM(X)$$

if fuzzy residues have been generated for said encryption key, and defined by:

$$\gamma=K_e\times X$$

otherwise.
means for accepting a ciphertext;
means for obtaining a decryption key corresponding to said encryption key;
means for decrypting said ciphertext to recover said message via decrypting each of the blocks of said ciphertext, and corresponding to a standard section i of said encryption key set, the decryption is carried out according to:

$$\gamma' \ll \Gamma_i^{-1}(\gamma')$$

$$y_{i,j} \ll \left\lfloor \frac{\gamma' - \sum_{m=j+1}^{z_i} (y_{i,m}*d_{i,m})}{d_{i,j}} \right\rfloor, \quad \text{for } 1\leq j\leq z_i$$

and after obtaining all $y_{i,j}$ for $1\leq j\leq z_i$, $\gamma'$ is adjusted by:

$$\gamma' \ll \gamma' - \sum_{j=1}^{z_i} (y_{i,j}*d_{i,j})$$

and corresponding to a submerged section i, the decryption is carried out according to:

$$\gamma' \ll \Gamma_i^{-1}(\gamma')$$

$$y_{i,j} \ll \frac{\gamma' - Y'\times\Omega}{2^{h(j-1)}*m_{i-1,t_{i-1}}}$$

where $\Omega$ is the set of element in $\Theta_{i-1}$ that are transformed from said decryption key set and Y' is the decrypted $\{y_{1,1}, y_{1,2}, \ldots, y_{i-1,u}\}$, where $u=z_{i-1}$,
and corresponding to a wrinkled section i, the decryption is carried out according to:

$$\gamma' \ll \Gamma_i^{-1}(\gamma')$$

$$q_i \ll \left\lfloor \frac{\gamma'}{d_{i,1}} \right\rfloor$$

$$y_{i,j} \ll b'_{i,j}, \quad \text{for } 1 < j \leq z_i$$

$$y_{i,1} \ll q_i - \sum_{j=2}^{z_i} (y_{i,j})$$

where $b'_{i,j}$ is decoded multiple of identifiable $b_{i,j}$ contained in $\gamma'$, and after obtaining $q_i$, $\gamma'$ is adjusted by: $\gamma' < \gamma' - q_i * d_{i,1}$.

and corresponding to an individually mapped section i, the decryption is carried out, for $j=z_1$ down to 1, according to:

$$\gamma' < \Gamma_i^{-1}(\gamma')$$

$y_{i,j} < q$, satisfying:

$$FM(q-1)+(q-1)*d_{i,j} \leq FM(q)+q*d_{i,j} < FM(q+1)+(q+1)*d_{i,j}$$

and after obtaining each $y_{i,j}$, $\gamma'$ is adjusted by:

$$\gamma' < \gamma' - y_{i,j} * d_{i,j} - FM(y_{i,j})$$

and corresponding to a multiply mapped section i, the decryption is carried out, for $j=z_i$ down to 1, according to:

$$\gamma' < \Gamma_i^{-1}(\gamma')$$

$y_{i,j} < q$, for the largest q satisfying:

$$FM(q)+q*d_{i,j} \leq \gamma'$$

and after obtaining each $y_{i,j}$, $\gamma'$ is adjusted by:

$$\gamma' \ll \gamma' - y_{i,j} * d_{i,j} - \left( SM\left( \sum_{m=j}^{z_i} IM(y_{i,m}) \right) \right) - \left( SM\left( \sum_{m=j+1}^{z_i} IM(y_{i,m}) \right) \right)$$

where fore the decryption of section k, the last generated section of the decryption key set, $\gamma'$ equals the ciphertext $\gamma$ to be decrypted and $$\Gamma_i^{-1} = \Gamma_{i,1}^{-1} \circ \Gamma_{i,2}^{-1} \circ \ldots \circ \Gamma_{i,y_i}$$

$$\Gamma_{u,v}^{-}(\mu) = C_{u,v}^{-1}((w_{u,v}^{-1} * \mu) \Xi m_{u,v})$$

$C_{u,v}^{-1}$ denotes the reverse of $C_{u,v}$, where $C_{u,v}^{-1}(\mu)$, for any number $\mu$, is defined as:

$\mu + m_{u,v}$    if $\mu < -NEG_{u,v}$   or $\mu - m_{u,v}$    if $\mu > POS_{u,v}$   or $\mu$ otherwise $$NEG_{u,v} = \sum_{\substack{\theta < 0 \\ \theta \in \Theta_{u,v-1}}} \theta$$

$$POS_{u,v} = \sum_{\substack{\theta > 0 \\ \theta \in \Theta_{u,v-1}}} \theta.$$

* * * * *